(12) United States Patent
Kamon et al.

(10) Patent No.: US 9,850,613 B2
(45) Date of Patent: Dec. 26, 2017

(54) LAUNDRY SYSTEM, COMMUNICATION DEVICE, COMMUNICATION METHOD, COMMUNICATION PROGRAM AND WASHING MACHINE

(75) Inventors: Kenichi Kamon, Shiga (JP); Kazunori Kurimoto, Hyogo (JP); Kazuhiro Kuroyama, Osaka (JP); Yuko Omura, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 650 days.

(21) Appl. No.: 14/342,950

(22) PCT Filed: Aug. 2, 2012

(86) PCT No.: PCT/JP2012/004904
§ 371 (c)(1),
(2), (4) Date: Mar. 5, 2014

(87) PCT Pub. No.: WO2013/035242
PCT Pub. Date: Mar. 14, 2013

(65) Prior Publication Data
US 2014/0236328 A1   Aug. 21, 2014

(30) Foreign Application Priority Data

Sep. 9, 2011 (JP) ................... 2011-197408

(51) Int. Cl.
*D06F 33/02* (2006.01)
*D06F 39/02* (2006.01)
(Continued)

(52) U.S. Cl.
CPC ............ *D06F 33/02* (2013.01); *D06F 39/005* (2013.01); *D06F 39/02* (2013.01);
(Continued)

(58) Field of Classification Search
CPC ............ H04M 1/7253; H04M 2250/04; G05B 2219/2633; D06F 33/02; D06F 39/005;
(Continued)

(56) References Cited

U.S. PATENT DOCUMENTS 5,390,385 A * 2/1995 Beldham ............... D06F 39/022
68/12.18
5,606,877 A * 3/1997 Hashimoto ........... D06F 35/006
68/12.04

(Continued)

FOREIGN PATENT DOCUMENTS

CN    1343806 A    4/2002
CN    1714191 A    12/2005
(Continued)

OTHER PUBLICATIONS

Isshiki, Masao et al., "Home Network no Tenkai Tsunagaru, Hirogaru, Kurashi ga Kawaru Advancement of home Networks—FEMINITY™ Series Home Network System for Network Home Appliances," Toshiba Review, vol. 57, No. 10, Oct. 2002, pp. 7-10.
(Continued)

*Primary Examiner* — Kenneth M Lo
*Assistant Examiner* — Michael W Choi
(74) *Attorney, Agent, or Firm* — Brinks Gilson & Lione

(57) ABSTRACT

A display control unit switches a display screen to a detergent name list screen based on detergent name list screen information received by a second communication unit, an operation unit accepts a selection of an arbitrary detergent name by a user from a plurality of detergent names displayed as a list on the detergent name list screen, the second communication unit transmits, to a server, detergent name specifying information for specifying the arbitrary detergent name accepted by the operation unit and washing machine specifying information and receives, from the server, deter-
(Continued)

gent information related to a detergent specified based on the detergent name specifying information and the washing machine specifying information, and a first communication unit transmits the detergent information received by the second communication unit to a washing machine.

13 Claims, 10 Drawing Sheets

(51) Int. Cl.
  *D06F 39/00* (2006.01)
  *H04M 1/725* (2006.01)
(52) U.S. Cl.
  CPC .... *D06F 2202/02* (2013.01); *D06F 2202/085* (2013.01); *D06F 2202/10* (2013.01); *D06F 2210/00* (2013.01); *D06F 2216/00* (2013.01); *H04M 1/7253* (2013.01); *H04M 2250/04* (2013.01)
(58) Field of Classification Search
  CPC ............ D06F 39/02; D06F 2202/02; D06F 2202/085; D06F 2202/10; D06F 2210/00; D06F 2216/00
  USPC .......................................................... 700/90
  See application file for complete search history.

(56) References Cited

U.S. PATENT DOCUMENTS

| | | | |
|---|---|---|---|
| 2001/0049846 A1 | 12/2001 | Guzzi et al. | |
| 2002/0040505 A1* | 4/2002 | Tanaka | D06F 39/005 8/158 |
| 2005/0050647 A1 | 3/2005 | Tanaka et al. | |
| 2005/0109070 A1* | 5/2005 | Kobayashi | D06F 39/005 68/3 R |
| 2006/0190266 A1* | 8/2006 | Tanigawa | D06F 39/003 704/273 |
| 2007/0015534 A1 | 1/2007 | Shimizu | |
| 2010/0095465 A1* | 4/2010 | Kim | D06F 35/006 8/137 |
| 2010/0125364 A1* | 5/2010 | Ebrom | D06F 33/02 700/275 |
| 2010/0186460 A1* | 7/2010 | Boldt | D06F 33/02 68/17 R |
| 2011/0304583 A1* | 12/2011 | Kruglick | G06F 3/044 345/174 |

FOREIGN PATENT DOCUMENTS

| | | |
|---|---|---|
| CN | 1897597 A | 1/2007 |
| JP | 2002-085886 A | 3/2002 |
| JP | 2003-047796 A | 2/2003 |
| JP | 2003-079990 A | 3/2003 |
| JP | 2003-164695 A | 6/2003 |
| JP | 2003-284889 A | 10/2003 |
| JP | 2004-341908 A | 12/2004 |
| JP | 2005-046418 A | 2/2005 |
| JP | 2007-134962 A | 5/2007 |

OTHER PUBLICATIONS

International Search Report for International Application No. PCT/JP2012/004904, dated Oct. 16, 2012, 2 pages.

Office Action and Search Report, and partial English language translation thereof, in corresponding Chinese Application No. 201280043581.6, dated Jul. 16, 2015, 15 pages.

* cited by examiner

TOUCH CORRESPONDING
HOME APPLIANCE

FIG. 9

| WATER LEVEL | CUP COUNT |
|---|---|
| 10 | 0.5 |
| 20 | 1.0 |
| 30 | 1.4 |

FIG. 10

| WATER LEVEL | CUP COUNT | NUMBER OF RINSES |
|---|---|---|
| 10 | 0.4 | 2 |
| 20 | 0.8 | |
| 30 | 1.1 | |

FIG. 11

| WATER LEVEL | CUP COUNT | NUMBER OF RINSES |
|---|---|---|
| 10 | 0.5 | 1 |
| 20 | 1.0 | |
| 30 | 1.4 | |

FIG. 12

| CUP COUNT CALCULATION COEFFICIENT | NUMBER OF RINSES |
|---|---|
| 0.8 | 2 |

FIG. 13A

| WATER LEVEL | CUP COUNT | NUMBER OF RINSES |
|---|---|---|
| 10 | 0.5 | |
| 20 | 1.0 | 1 |
| 30 | 1.4 | |

FIG. 13B

| WATER LEVEL | CUP COUNT | NUMBER OF RINSES |
|---|---|---|
| 10 | 0.4 | |
| 20 | 0.8 | 2 |
| 30 | 1.1 | |

| WATER LEVEL | CUP COUNT |
|---|---|
| 10 | 0.3 |
| 20 | 0.4 |
| 30 | 0.6 |

US 9,850,613 B2

LAUNDRY SYSTEM, COMMUNICATION DEVICE, COMMUNICATION METHOD, COMMUNICATION PROGRAM AND WASHING MACHINE

This application is a 371 application of PCT/JP2012/004904 having an international filing date of Aug. 2, 2012, which claims priority to JP2011-197408 filed Sep. 9, 2011, the entire contents of which are incorporated herein by reference.

TECHNICAL FIELD

The present invention relates to a communication device that communicates with a server and a washing machine, a communication method and a communication program, a washing machine, and a communication system including the server, the washing machine, and the communication device.

BACKGROUND ART

With conventional washing machines, when operation is started, an amount of clothing is detected, a water level of a washing tub necessary for laundry is determined based on the detected amount of clothing, and an amount of detergent corresponding to the determined water level is displayed on display unit.

In this case, the amount of detergent is set so as to conform to one representative compact synthetic detergent determined in advance by a washing machine manufacturer. Therefore, the display unit displays an amount of detergent necessary for laundry using the representative compact synthetic detergent in units of measuring cups or, in other words, how many measuring cups of the representative compact synthetic detergent is required.

A plurality of types of detergents are used in washing machines including compact synthetic detergents, general synthetic detergents, compact washing powders, and general washing powders. The amount of detergent described on a detergent differs depending on the type of detergent. In addition, even with a same type of detergent, the amount of detergent described on a detergent and a volume of a measuring cup differs from one detergent manufacturer to another.

With conventional washing machines, since an amount of detergent or a cup count as measured in measuring cups is displayed in accordance with a compact synthetic detergent of one representative brand, there is a problem that the displayed cup count as measured in measuring cups is inaccurate when a detergent of a different brand is used by a user.

In consideration thereof, a washing machine is known in which, based on a water level displayed on a detergent and an amount of detergent in accordance with the water level which are inputted using input unit, an amount of detergent necessary for washing an amount of clothing in a washing tub is calculated and the calculated amount of detergent is displayed (for example, refer to Patent Literature 1).

However, in the case of the washing machine according to Patent Literature 1, since a user must input a water level displayed on a detergent and an amount of detergent in accordance with the water level every time laundry is performed or every time a different detergent is used, operations become a hassle.

CITATION LIST

Patent Literature

Patent Literature 1: Japanese Patent Application Laid-open No. 2003-164695

SUMMARY OF THE INVENTION

The present invention has been made in order to solve the problem described above and an object thereof is to provide a laundry system, a communication device, a communication method, a communication program, and a washing machine which enable an accurate amount of detergent that conforms to a detergent to be readily set even when a different detergent is used.

A laundry system according to an aspect of the present invention comprises: a server; a washing machine; and a communication device communicably connected to the server and the washing machine, wherein: the communication device includes: a first communication unit that communicates with the washing machine using wireless communication; a second communication unit that communicates with the server using a network; a display unit that displays a detergent name list screen on which a plurality of detergent names corresponding to a plurality of detergents to be used in the washing machine are displayed as a list; an input accepting unit that accepts input by a user; and a display control unit that switches a display screen to be displayed on the display unit to the detergent name list screen, the first communication unit transmitting, to the washing machine, request information that requests washing machine specifying information for specifying the washing machine and receiving the washing machine specifying information from the washing machine, the second communication unit transmitting, to the server, the washing machine specifying information received by the first communication unit and receiving, from the server, detergent name list screen information for causing the detergent name list screen to be displayed, the display control unit switching the display screen to the detergent name list screen based on the detergent name list screen information received by the second communication unit, the input accepting unit accepting a selection of an arbitrary detergent name by the user from the plurality of detergent names displayed as a list on the detergent name list screen, the second communication unit transmitting, to the server, detergent name specifying information for specifying the arbitrary detergent name accepted by the input accepting unit and the washing machine specifying information and receiving, from the server, detergent information related to a detergent specified based on the detergent name specifying information and the washing machine specifying information, and the first communication unit transmitting the detergent information received by the second communication unit to the washing machine, the washing machine includes: a washing machine specifying information storage unit that stores the washing machine specifying information; a washing machine communication unit that communicates with the communication device using wireless communication; and a washing machine control unit which, when the request information from the communication device is received by the washing machine communication unit, reads out the washing machine specifying information from the washing machine specifying information storage unit and controls the washing machine communication unit so as to transmit the read-out washing machine specifying information to the communication device, and when the detergent information from the communication device is received by the washing machine communication unit, controls a laundry operation based on the received detergent information, and the server includes: a server communication unit that communicates with the communication device using a network; a first detergent information storage unit that stores, for each type of washing machine, the detergent information corresponding to each of a plurality of detergent names; and a server control unit which, when the washing machine specifying information from the communication device is received by the server communication unit, creates the detergent name list screen information in accordance with a washing machine specified by the washing machine specifying information and controls the server communication unit so as to transmit the created detergent name list screen information to the communication device, and when the detergent name specifying information and the washing machine specifying information from the communication device are received by the server communication unit, reads out the detergent information specified based on the detergent name specifying information and the washing machine specifying information from the first detergent information storage unit and controls the server communication unit so as to transmit the read-out detergent information to the communication device.

According to this configuration, a first communication unit of a communication device communicates with a washing machine using wireless communication and a second communication unit of the communication device communicates with a server using a network. A display unit of the communication device displays a detergent name list screen on which a plurality of detergent names corresponding to a plurality of detergents to be used in the washing machine are displayed as a list. An input accepting unit of the communication device accepts input by a user. The display control unit of the communication device switches a display screen to be displayed on the display unit to the detergent name list screen. In addition, the first communication unit transmits, to the washing machine, request information that requests washing machine specifying information for specifying the washing machine and receives the washing machine specifying information from the washing machine. The second communication unit transmits, to the server, the washing machine specifying information received by the first communication unit and receives, from the server, detergent name list screen information for causing the detergent name list screen to be displayed. The display control unit switches the display screen to the detergent name list screen based on the detergent name list screen information received by the second communication unit. The input accepting unit accepts a selection of an arbitrary detergent name by the user from the plurality of detergent names displayed as a list on the detergent name list screen. The second communication unit transmits, to the server, detergent name specifying information for specifying the arbitrary detergent name accepted by the input accepting unit and the washing machine specifying information and receives, from the server, detergent information related to a detergent specified based on the detergent name specifying information and the washing machine specifying information. The first communication unit transmits the detergent information received by the second communication unit to the washing machine. In addition, a washing machine specifying information storage unit of the washing machine stores the washing machine specifying information. A washing machine communication unit of the washing machine communicates with the communication device using wireless communication. When the request information from the communication device is received by the washing machine communication unit, a washing machine control unit of the washing machine reads out the washing machine specifying information from the washing machine specifying information storage unit and controls the washing machine communication unit so as to transmit the read-out washing machine specifying information to the communication device. When the detergent information from the communication device is received by the washing machine communication unit, the washing machine control unit of the washing machine controls a laundry operation based on the received detergent information. A server communication unit of the server communicates with the communication device using a network. A first detergent information storage unit of the server stores, for each type of washing machine, the detergent information corresponding to each of a plurality of detergent names. When the washing machine specifying information from the communication device is received by the server communication unit, a server control unit of the server creates the detergent name list screen information in accordance with a washing machine specified by the washing machine specifying information and controls the server communication unit so as to transmit the created detergent name list screen information to the communication device. When the detergent name specifying information and the washing machine specifying information from the communication device are received by the server communication unit, the server control unit of the server reads out the detergent information specified based on the detergent name specifying information and the washing machine specifying information from the first detergent information storage unit and controls the server communication unit so as to transmit the read-out detergent information to the communication device.

According to the present invention, since a selection of an arbitrary detergent name by the user from a plurality of detergent names displayed as a list on the detergent name list screen is accepted, detergent information related to a detergent specified based on washing machine specifying information for specifying a washing machine and detergent name specifying information for specifying the arbitrary detergent name is transmitted to the washing machine, and a laundry operation of the washing machine is controlled based on the detergent information, an accurate amount of detergent that conforms to a detergent can be readily set even when a different detergent is used. Specifically, since an accurate amount of detergent can be set simply by selecting information displayed on a communication device and having a washing machine and the communication device communicate with each other rather than inputting a water level and an amount of detergent corresponding to the water level, operations are simplified.

This and other objects, features, and advantages of the present invention will become more apparent as the following detailed description is read with reference to the accompanying drawings.

BRIEF DESCRIPTION OF THE DRAWINGS

FIG. 9 is a diagram showing an example of detergent information according to the present embodiment.

FIG. 10 is a diagram showing a first modification of detergent information according to the present embodiment.

FIG. 11 is a diagram showing a second modification of detergent information according to the present embodiment.

FIG. 12 is a diagram showing a third modification of detergent information according to the present embodiment.

FIG. 13A is a diagram showing an example of table data before update that is stored in a detergent information storage unit, and FIG. 13B is a diagram showing an example of table data after update that is stored in the detergent information storage unit.

DESCRIPTION OF EMBODIMENTS

Hereinafter, an embodiment of the present invention will be described with reference to the accompanying drawings. It should be noted that the embodiment described below is merely a concrete example of the present invention and is not intended to limit the technical scope of the present invention.

Figure 1:
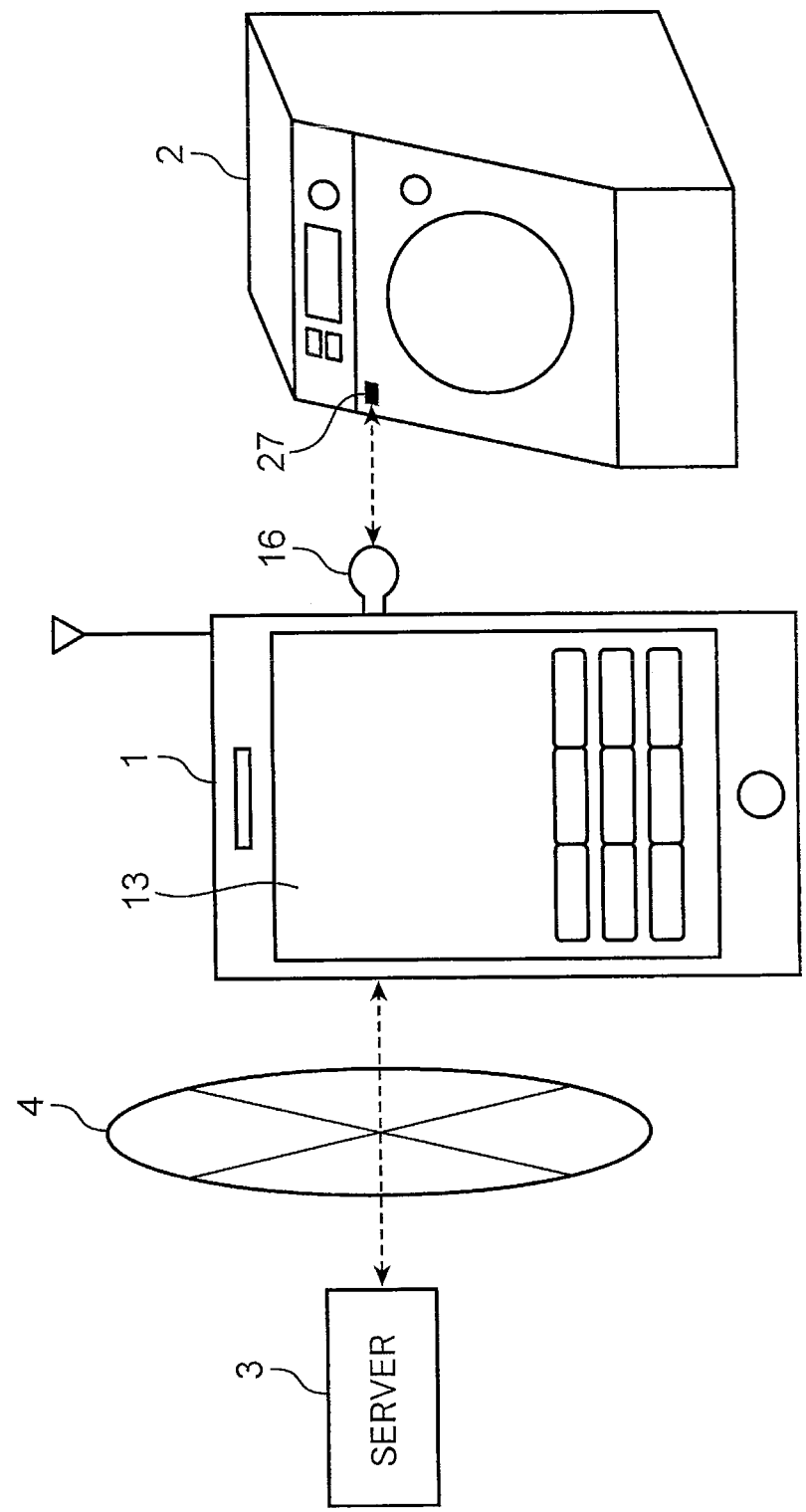
FIG. 1 is a diagram showing an overall configuration of a laundry system according to an embodiment of the present invention.

FIG. 1 is a diagram showing an overall configuration of a laundry system according to an embodiment of the present invention. The laundry system shown in FIG. 1 includes a portable device 1, a washing machine 2, and a server 3.

The portable device 1 is constituted by a communication device such as a mobile phone. The portable device 1 is connected so as to be communicable with the washing machine 2 via a loop antenna 16 using near-field wireless communication and to be communicable with the server 3 via a network 4. Although the portable device 1 may be any kind of device as long as the portable device 1 is provided with a reader/writer that is capable of communicating with an RFID (Radio Frequency IDentification) or NFC (Near Field Communication) of the washing machine 2, the portable device 1 is more favorably portable.

The washing machine 2 is a device that is communicable with a reader/writer by passive/active RFID or NFC. The washing machine 2 communicates with the portable device 1 via a loop antenna 27 using near-field wireless communication. The washing machine 2 washes clothes using a detergent. Moreover, in addition to a washing function, the washing machine 2 may also be equipped with a rinsing function, a spinning function, and a drying function.

The server 3 is constituted by a known server computer or the like and is connected so as to be communicable with the portable device 1 via the network 4.

Figure 2:
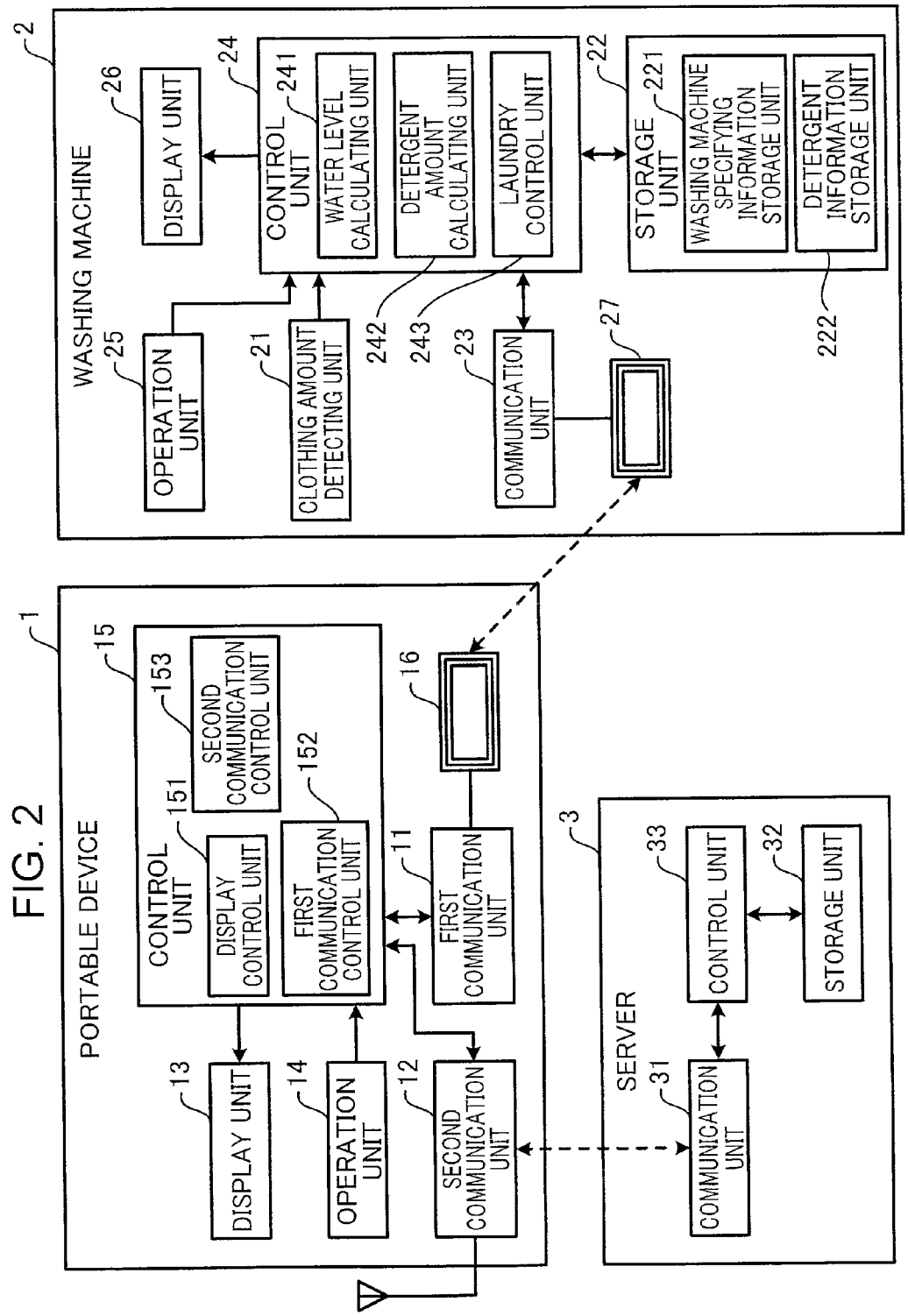
FIG. 2 is a diagram showing a detailed configuration of the laundry system according to the embodiment of the present invention.

FIG. 2 is a diagram showing a detailed configuration of the laundry system according to the embodiment of the present invention.

The portable device 1 includes a first communication unit 11, a second communication unit 12, a display unit 13, an operation unit 14, a control unit 15, and the loop antenna 16.

The first communication unit 11 communicates with the washing machine 2 via the loop antenna 16 using near-field wireless communication.

The loop antenna 16 is an antenna for performing near-field wireless communication. In the present embodiment, although high frequency band RFID or NFC using, for example, the 13.56 MHz band is assumed as the near-field wireless communication, near-field wireless communication is not limited to this frequency band. The frequency band of the near-field wireless communication may be a UHF band ranging from 90 MHz to 1 GHz or a frequency band exceeding 2 GHz.

Near-field wireless communication has a short communication range and requires that loop antennas of two wireless communication devices to engage in communication be brought close to each other. A surface of a wireless communication device on which a loop antenna is mounted is marked with a position of the loop antenna. The user brings the respective marks of the two wireless communication devices close to each other to have the two wireless communication devices perform communication. Since RFID built into a mobile phone does not enable output of the loop antenna to be increased, positioning of the loop antennas must be performed in units of, for example, several mm. Therefore, the respective loop antennas must be brought close to each other in an accurate manner.

Moreover, in the present embodiment, the first communication unit 11 communicates with the washing machine 2 via the loop antenna 16 using near-field wireless communication. However, the present invention is not particularly limited thereto and wireless communication other than near-field wireless communication such as those using radio waves or light may be used instead.

The second communication unit 12 communicates with the server using the network 4. Moreover, the network 4 is, for example, a mobile communication network.

The display unit 13 displays a communication instructing screen that instructs the user to cause the first communication unit 11 and the washing machine 2 to communicate with each other and a detergent name list screen on which a plurality of detergent names corresponding to a plurality of detergents to be used in the washing machine 2 are displayed as a list.

The operation unit 14 is constituted by a touch panel, operation keys, or the like and accepts input operations performed by the user.

The control unit 15 controls the entire portable device 1 and includes a display control unit 151, a first communication control unit 152, and a second communication control unit 153.

The display control unit 151 switches a display screen to be displayed on the display unit 13 to either the communication instructing screen or the detergent name list screen. The first communication control unit 152 controls the first communication unit 11. The second communication control unit 153 controls the second communication unit 12.

After the communication instructing screen is displayed on the display unit 13, the first communication unit 11 transmits request information that requests washing machine specifying information for specifying the washing machine 2 to the washing machine 2 and receives the washing machine specifying information from the washing machine 2. In the present embodiment, the communication instructing screen is a screen that instructs the user to cause the first communication unit 11 and the washing machine 2 to approach each other so that communication is performed between the first communication unit 11 and the washing machine 2. After the first communication unit 11 and the washing machine 2 have approached each other within a communicable range, the first communication unit 11 receives the washing machine specifying information from the washing machine 2.

The second communication unit 12 transmits the washing machine specifying information received by the first communication unit 11 to the server 3 and receives detergent name list screen information for causing the detergent name list screen to be displayed from the server 3. The display control unit 151 switches the display screen to the detergent name list screen based on the detergent name list screen information received by the second communication unit 12.

The operation unit 14 accepts a selection of an arbitrary detergent name by the user from the plurality of detergent names displayed as a list on the detergent name list screen. The second communication unit 12 transmits, to the server 3, detergent name specifying information for specifying the arbitrary detergent name accepted by the operation unit 14 and the washing machine specifying information and receives, from the server 3, detergent information related to a detergent specified based on the detergent name specifying information and the washing machine specifying information.

When detergent information is received by the second communication unit 12, the display control unit 151 switches the display screen to the communication instructing screen. The first communication unit 11 transmits the detergent information received by the second communication unit 12 to the washing machine 2.

In addition, the first communication unit 11 receives storage completion notification notifying that detergent information has been stored in the washing machine 2 from the washing machine 2. The display unit 13 further displays a storage completion notification screen notifying the user that the detergent information has been stored in the washing machine 2. When a storage completion notification is received by the first communication unit 11, the display control unit 151 switches the display screen to the storage completion notification screen.

The washing machine 2 includes a clothing amount detecting unit 21, a storage unit 22, a communication unit 23, a control unit 24, an operation unit 25, a display unit 26, and the loop antenna 27.

The clothing amount detecting unit 21 detects an amount of clothing in a washing tub.

The storage unit 22 includes a washing machine specifying information storage unit 221 and a detergent information storage unit 222. The washing machine specifying information storage unit 221 stores, in advance, washing machine specifying information for specifying the washing machine 2 such as a model number, a serial number, or the like of the washing machine 2. Moreover, the washing machine specifying information is stored in advance at the time of manufacture. The detergent information storage unit 222 stores detergent information corresponding to the washing machine 2. Detergent information includes a table representing a relationship between water levels during laundry and a cup count as measured in a measuring instrument of the detergent.

In addition, the storage unit 22 may store state information such as a use history and error information of the washing machine 2. Moreover, in order to register the washing machine 2 in a database of the server 3, the storage unit 22 favorably includes information that enables a manufacturer of the washing machine 2 to be specified, information that enables a manufacturing date of the washing machine 2 to be specified, information that enables a manufacturing facility of the washing machine 2 to be specified, and the like. In addition, the storage unit 22 favorably includes server specifying information (for example, a URI (Uniform Resource Identifier)) for accessing servers that differ for each manufacturer of the washing machine 2. Accordingly, the server 3 can be readily accessed from the portable device 1. In addition, by retaining a URI in the storage unit 22 of the washing machine 2, the portable device 1 can access a server unique to the washing machine 2 regardless of the device type of the portable device 1.

The communication unit 23 bidirectionally transmits and receives various information to and from the portable device 1 via the loop antenna 27 using near-field wireless communication. The loop antenna 27 is an antenna for performing near-field wireless communication.

The control unit 24 is constituted by a CPU (central processing unit) or the like and controls operations of the communication unit 23 and controls operations of the storage unit 22 in accordance with information received via the communication unit 23 and the like. In addition, the control unit 24 includes a water level calculating unit 241, a detergent amount calculating unit 242, and a laundry control unit 243.

The water level calculating unit 241 calculates a water level in accordance with the amount of clothing in the washing tub which is detected by the clothing amount detecting unit 21. The detergent amount calculating unit 242 calculates an amount of detergent in accordance with the water level calculated by the water level calculating unit 241. The detergent amount calculating unit 242 reads out an amount of detergent stored in the detergent information storage unit 222 which corresponds to the water level calculated by the water level calculating unit 241. Moreover, while an amount of detergent is expressed by a cup count as measured in a measuring instrument in the present embodiment, the present invention is not particularly limited thereto and an amount of detergent may be expressed by weight, volume, or the like.

When request information from the portable device 1 is received by the communication unit 23, the laundry control unit 243 reads out washing machine specifying information from the washing machine specifying information storage unit 221 and controls the communication unit 23 so as to transmit the read-out washing machine specifying information to the portable device 1. In addition, when the detergent information from the portable device 1 is received by the communication unit 23, the laundry control unit 243 controls a laundry operation based on the received detergent information.

Furthermore, when detergent information from the portable device 1 is received by the communication unit 23, the laundry control unit 243 stores the received detergent information in the detergent information storage unit 222 and controls a laundry operation based on the detergent information stored in the detergent information storage unit 222.

Moreover, when the received detergent information is stored in the detergent information storage unit 222, the laundry control unit 243 controls the communication unit 23 so as to transmit a storage completion notification notifying that detergent information has been stored in the washing machine 2 to the portable device 1. The communication unit 23 transmits the storage completion notification to the portable device 1.

The operation unit 25 is constituted by operation buttons or the like and accepts input operations performed by the user.

The display unit 26 is constituted by a light-emitting diode or the like and displays an amount of detergent necessary for washing the amount of clothing in the washing tub or, in other words, a cup count as measured in a measuring instrument. Moreover, the display unit 26 may digitally display a water level, a washing time, the number of rinses, a spinning time, a remaining time, a reservation time, or the like.

The server 3 includes a communication unit 31, a storage unit 32, and a control unit 33.

The communication unit 31 communicates with the portable device 1 using the network 4.

The storage unit 32 stores a menu screen to be displayed on the portable device 1 for each product of the washing machine 2. In addition, the storage unit 32 stores detergent name list screen information in accordance with the washing machine 2 that is specified by washing machine specifying information. Furthermore, the storage unit 32 stores, for each type of washing machine, the detergent information corresponding to each of a plurality of detergent names.

The control unit 33 is constituted by a CPU or the like and controls operations of the communication unit 31 and controls operations of the storage unit 32 in accordance with information received via the communication unit 31 and the like. When the washing machine specifying information from the portable device 1 is received by the communication unit 31, the control unit 33 creates detergent name list screen information in accordance with a washing machine specified by the washing machine specifying information and controls the communication unit 31 so as to transmit the created detergent name list screen information to the portable device 1. In addition, when the detergent name specifying information and the washing machine specifying information from the portable device 1 are received by the communication unit 31, the control unit 33 reads out the detergent information specified based on the detergent name specifying information and the washing machine specifying information from the storage unit 32 and controls the communication unit 31 so as to transmit the read-out detergent information to the portable device 1.

Moreover, in the present embodiment, the portable device 1 corresponds to an example of the communication device, the washing machine 2 corresponds to an example of the washing machine, the server 3 corresponds to an example of the server, the first communication unit 11 corresponds to an example of the first communication unit, the second communication unit 12 corresponds to an example of the second communication unit, the display unit 13 corresponds to an example of the display unit, the operation unit 14 corresponds to an example of the input accepting unit, the display control unit 151 corresponds to an example of the display control unit, the washing machine specifying information storage unit 221 corresponds to an example of the washing machine specifying information storage unit, the communication unit 23 corresponds to an example of the washing machine communication unit, the laundry control unit 243 corresponds to an example of the washing machine control unit, the communication unit 31 corresponds to an example of the server communication unit, the storage unit 32 corresponds to an example of the first detergent information storage unit, the control unit 33 corresponds to an example of the server control unit, the detergent information storage unit 222 corresponds to an example of the second detergent information storage unit, the first communication control unit 152 corresponds to an example of the first communication control unit, and the second communication control unit 153 corresponds to an example of the second communication control unit.

Figure 3:
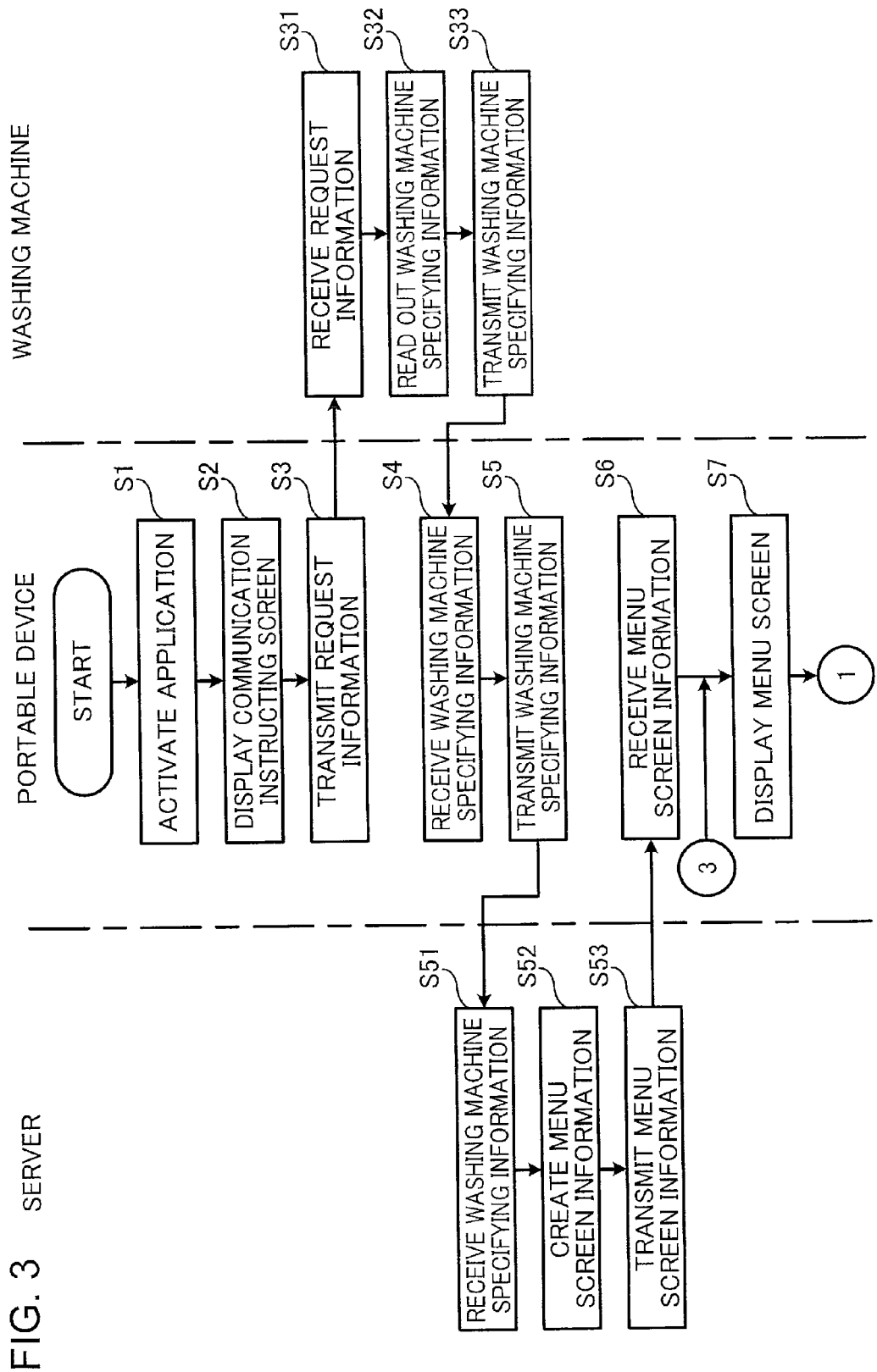
FIG. 3 is a first flow chart for describing operations of the laundry system according to the embodiment of the present invention.
Figure 4:
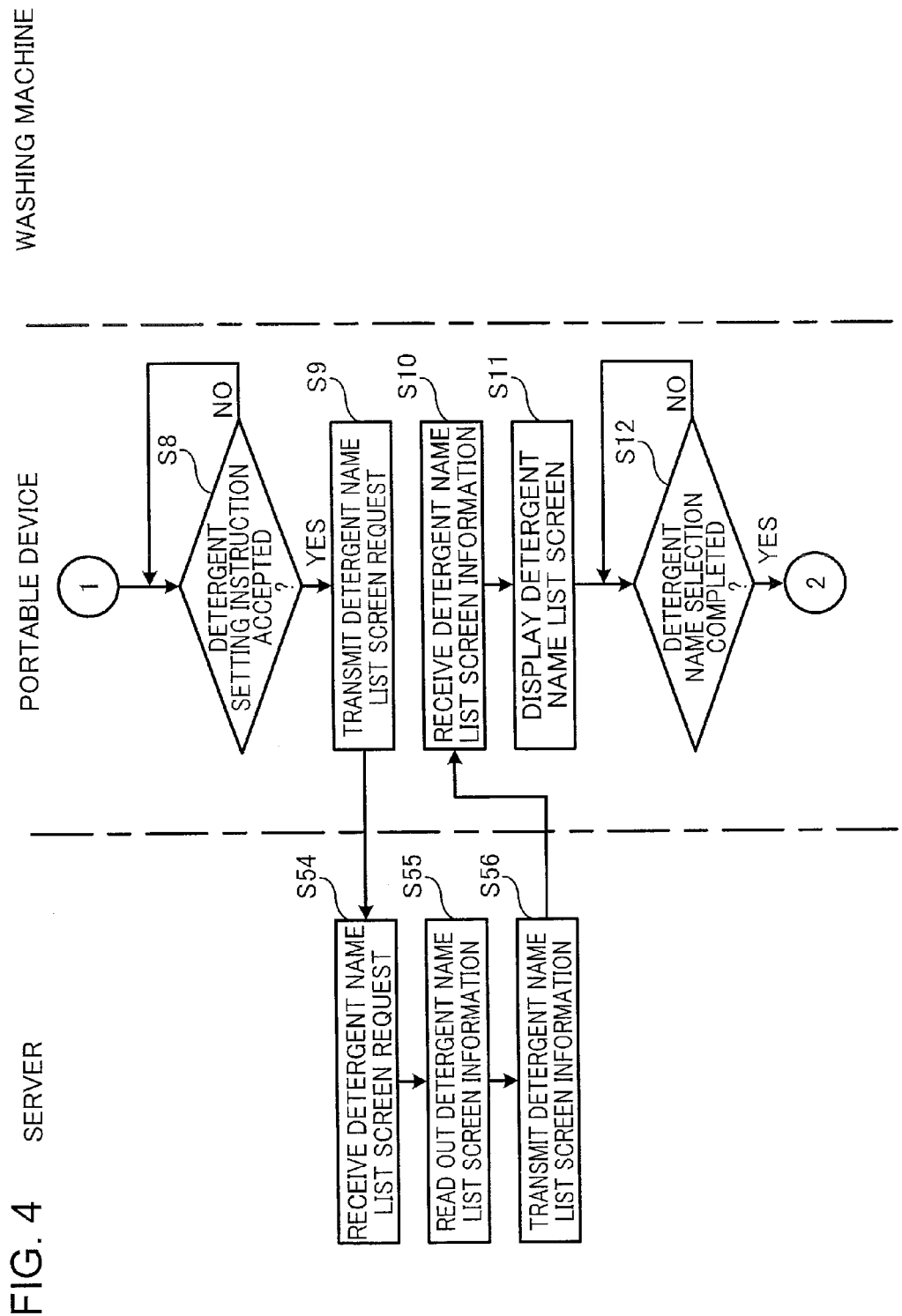
FIG. 4 is a second flow chart for describing operations of the laundry system according to the embodiment of the present invention.
Figure 5:
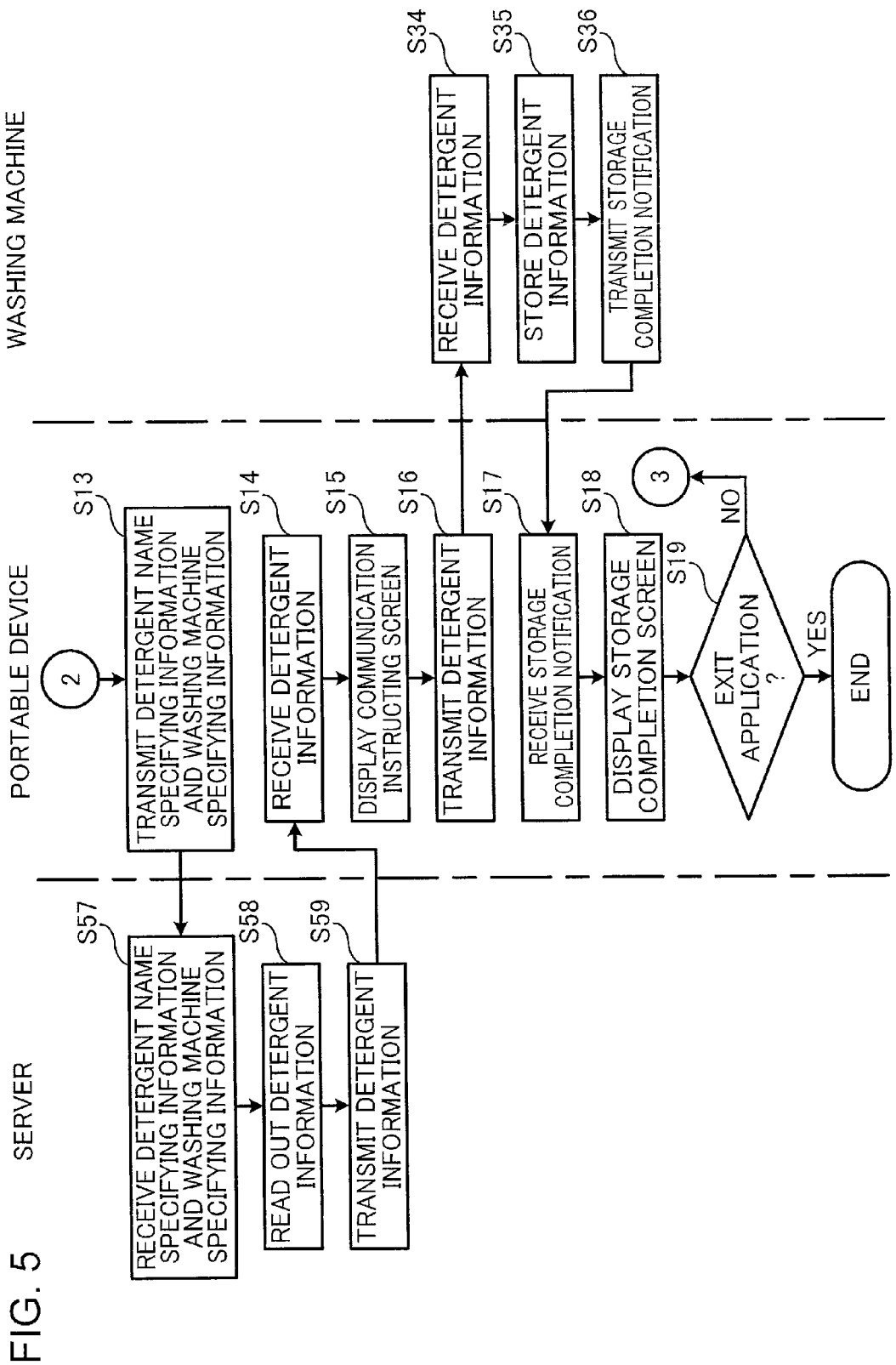
FIG. 5 is a third flow chart for describing operations of the laundry system according to the embodiment of the present invention.

Next, operations of the laundry system according to the embodiment of the present invention will be described. FIGS. 3 to 5 are flow charts for describing operations of the laundry system according to the embodiment of the present invention.

First, in step S1, the control unit 15 of the portable device 1 activates an application for displaying a menu screen for controlling the washing machine 2 on the display unit 13. At this point, the operation unit 14 accepts an activation instruction of the application by the user. The control unit 15 activates the application based on the accepted activation instruction.

Next, in step S2, the display control unit 151 controls the display unit 13 so as to display a communication instructing screen for instructing the user to cause the first communication unit 11 and the washing machine 2 to approach each other so that communication is performed between the first communication unit 11 and the washing machine 2. The display unit 13 displays the communication instructing screen. In addition, more specifically, the communication instructing screen is a screen for instructing the user to cause the loop antenna 16 of the portable device 1 and the loop antenna 27 of the washing machine 2 to approach each other. Furthermore, the communication instructing screen is stored in advance in a storage unit (not shown) included in the portable device 1. The display control unit 151 reads out the communication instructing screen from the storage unit and displays the same.

Figure 6:
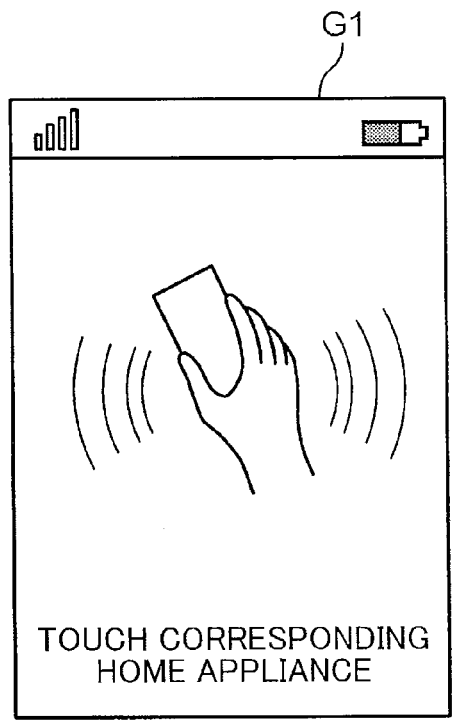
FIG. 6 is a diagram showing an example of a communication instructing screen according to the present embodiment.

FIG. 6 is a diagram showing an example of the communication instructing screen according to the present embodiment.

A communication instructing screen G1 shown in FIG. 6 displays, for example, a message reading "Touch corresponding home appliance". The communication instructing screen G1 is a screen that guides the user to cause the portable device 1 to approach the washing machine 2. When the communication instructing screen G1 is displayed on the display unit 13 of the portable device 1, the user causes the loop antenna 16 of the portable device 1 and the loop antenna 27 of the washing machine 2 to approach each other so that the portable device 1 and the washing machine 2 are within a distance that enables communication by near-field wireless communication.

Next, in step S3, after the communication instructing screen is displayed on the display unit 13, the first communication control unit 152 controls the first communication unit 11 so as to transmit request information that requests washing machine specifying information for specifying the washing machine 2 to the washing machine 2. After the communication instructing screen is displayed on the display unit 13, the first communication unit 11 transmits request information to the washing machine 2. Moreover, the first communication unit 11 starts transmission of the request information to the washing machine 2 in conjunction with the communication instructing screen being displayed on the display unit 13.

Next, in step S31, after the first communication unit 11 and the washing machine 2 have approached each other within a communicable range, the communication unit 23 of the washing machine 2 receives the request information transmitted by the first communication unit 11 of the portable device 1.

Next, in step S32, the laundry control unit 243 of the washing machine 2 reads out washing machine specifying information from the washing machine specifying information storage unit 221.

Next, in step S33, the laundry control unit 243 controls the communication unit 23 so as to transmit the washing machine specifying information to the portable device 1. The communication unit 23 transmits the washing machine specifying information to the portable device 1. Moreover, the request information includes address information for specifying the portable device 1. The communication unit 23 transmits the washing machine specifying information to the portable device 1 based on the address information included in the request information.

Alternatively, the laundry control unit 243 may transmit state information such as a use history and error information of the washing machine 2 together with the washing machine specifying information to the portable device 1. Error information is detected by, for example, an error detection unit (not shown) included in the washing machine 2.

Next, in step S4, the first communication unit 11 of the portable device 1 receives the washing machine specifying information transmitted by the communication unit 23 of the washing machine 2.

Next, in step S5, the second communication control unit 153 controls the second communication unit 12 so as to transmit the washing machine specifying information received by the first communication unit 11 to the server 3. The second communication unit 12 transmits the washing machine specifying information received by the first communication unit 11 to the server 3. The washing machine specifying information transmitted by the washing machine 2 is transmitted together with address information for specifying the server 3. The second communication unit 12 transmits the washing machine specifying information to the server 3 based on the address information that is transmitted together with the washing machine specifying information.

Although address information for specifying the server 3 is transmitted together with the washing machine specifying information transmitted by the washing machine 2 in the present embodiment, the present invention is not particularly limited thereto. Alternatively, the portable device 1 may store address information for specifying the server 3.

In addition, when the state information of the washing machine 2 is received together with the washing machine specifying information, the second communication unit 12 transmits the state information of the washing machine 2 to the server 3 together with the washing machine specifying information.

Next, in step S51, the communication unit 31 of the server 3 receives the washing machine specifying information transmitted by the second communication unit 12 of the portable device 1.

Next, in step S52, the control unit 33 creates menu screen information in accordance with the washing machine 2 specified by the washing machine specifying information. At this point, the control unit 33 reads out a menu screen in accordance with the washing machine 2 specified by the washing machine specifying information from the storage unit 32. Moreover, when the state information of the washing machine 2 is received together with the washing machine specifying information, the control unit 33 creates menu screen information including the state information of the washing machine 2.

Next, in step S53, the communication unit 31 transmits menu screen information for displaying a menu screen unique to the washing machine 2 to the portable device 1.

Next, in step S6, the second communication unit 12 of the portable device 1 receives the menu screen information transmitted by the communication unit 31 of the server 3.

Next, in step S7, the display control unit 151 switches the display screen to the menu screen based on the menu screen information received by the second communication unit 12. The display unit 13 displays a menu screen based on the menu screen information received by the second communication unit 12.

Alternatively, the portable device 1 may store the received menu screen information in a storage unit (not shown) included in the portable device 1. When menu screen information is stored in the storage unit, the display control unit 151 switches the display screen to the menu screen based on the menu screen information stored in the storage unit without displaying the communication instructing screen in step S2.

While the menu screen is being displayed, the operation unit 14 accepts a selection of an item displayed on the menu screen by the user. As a result, a screen in accordance with the selected item is displayed and control of the washing machine 2 in accordance with the selected item is performed.

Figure 7:
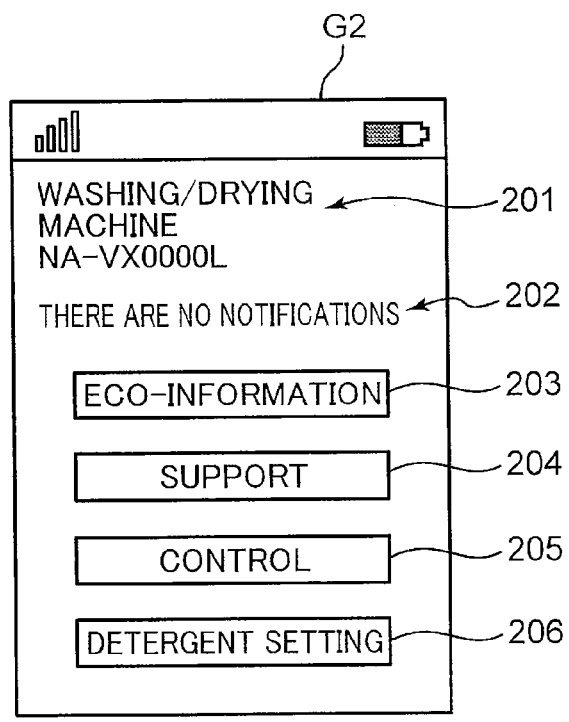
FIG. 7 is a diagram showing an example of a menu screen according to the present embodiment.

FIG. 7 is a diagram showing an example of the menu screen according to the present embodiment.

A menu screen G2 shown in FIG. 7 displays a product name 201 representing a product name and a product number of the washing machine 2, state information 202 representing a state of the washing machine 2, an eco-information display button 203 for displaying information related to energy conservation by the washing machine 2, a support information display button 204 for displaying support information of the washing machine 2, a control display button 205 for controlling operations of the washing machine 2, and a detergent setting button 206 for setting detergent information. The menu screen G2 shown in FIG. 7 represents a menu screen in a case where the washing machine 2 does not have any errors.

As shown in FIG. 7, when no errors are detected in the washing machine 2, a message reading "There are no notifications" is displayed as the state information 202 on the menu screen G2. In addition, the eco-information display button 203, the support information display button 204, the control display button 205, and the detergent setting button 206 can be selected via the operation unit 14. When the eco-information display button 203 is selected, a screen representing information related to energy conservation by the washing machine 2 such as power consumption is displayed. When the support information display button 204 is selected, a screen representing information for supporting the washing machine 2 is displayed. When the control display button 205 is selected, a screen for inputting settings of the washing machine 2 is displayed. In addition, when the detergent setting button 206 is selected, a detergent name list screen for inputting a name of a detergent to be used by the user is displayed.

Moreover, items displayed on the menu screen G2 are not limited to the items shown in FIG. 7 and various items can be displayed.

Next, in step S8, the display control unit 151 determines whether or not a detergent setting instruction has been accepted by the operation unit 14. In other words, the display control unit 151 determines whether or not the detergent setting button 206 displayed on the menu screen G2 has been selected. At this point, when it is determined that a detergent setting instruction has not been accepted (NO in step S8), a standby state is entered until a detergent setting instruction is accepted. Moreover, when another instruction related to, for example, the eco-information display button 203, the support information display button 204, and the control display button 205 is accepted in the standby state, display of a screen, operations of the portable device 1, and operations of the washing machine 2 in accordance with the other instruction are performed.

On the other hand, when it is determined that a detergent setting instruction has been accepted (YES in step S8), in step S9, the second communication control unit 153 controls the second communication unit 12 so as to transmit a detergent name list screen request that requests a detergent name list screen for selecting a name of a detergent to be used by the user to the server 3. The second communication unit 12 transmits the detergent name list screen request to the server 3. Moreover, the detergent name list screen request includes washing machine specifying information.

Next, in step S54, the communication unit 31 of the server 3 receives the detergent name list screen request transmitted by the second communication unit 12 of the portable device 1.

Next, in step S55, the control unit 33 reads out detergent name list screen information corresponding to the washing machine specifying information from the storage unit 32.

Next, in step S56, the control unit 33 controls the communication unit 31 so as to transmit the detergent name list screen information to the portable device 1. The communication unit 31 transmits the detergent name list screen information to the portable device 1.

Next, in step S10, the second communication unit 12 of the portable device 1 receives the detergent name list screen information transmitted by the communication unit 31 of the server 3.

Next, in step S11, the display control unit 151 of the portable device 1 switches the display screen from the menu screen to the detergent name list screen based on the detergent name list screen information received by the second communication unit 12. The display unit 13 displays the detergent name list screen for displaying a plurality of detergent names and accepting a selection of a desired detergent name by the user.

Figure 8:
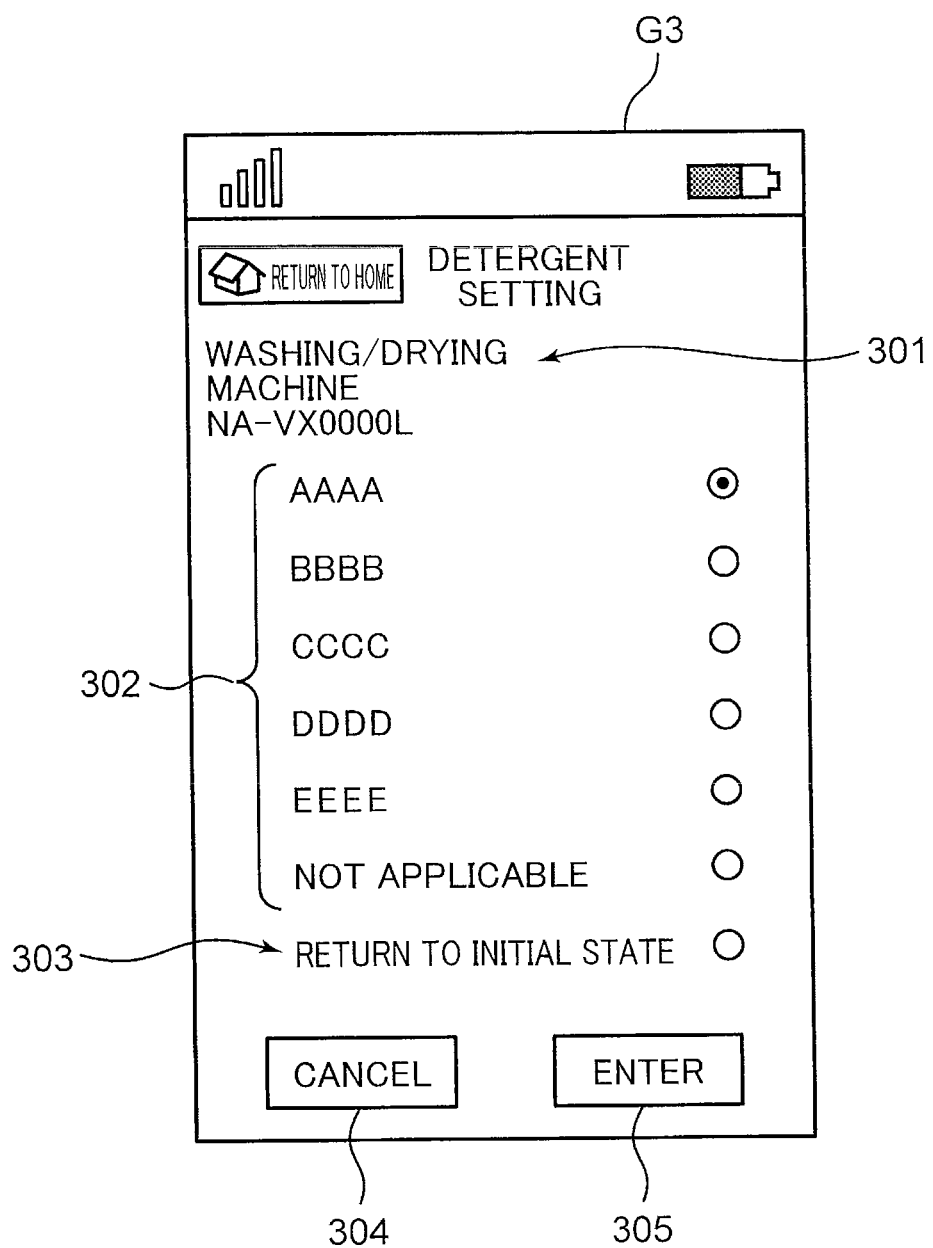
FIG. 8 is a diagram showing an example of a detergent name list screen according to the present embodiment.

FIG. 8 is a diagram showing an example of the detergent name list screen according to the present embodiment.

A detergent name list screen G3 shown in FIG. 8 displays a product name 301 representing a product name and a product number of the washing machine 2, a detergent name selecting unit 302 that accepts a selection of a name of an arbitrary detergent to be used by the user from a plurality of detergent names, an initial state setting selecting unit 303 for returning detergent information to an initial state, a cancel button 304 for canceling inputted contents, and an enter button 305 for finalizing inputted contents. Moreover, "AAAA", "BBBB", "CCCC", "DDDD", and "EEEE" in FIG. 8 represent specific detergent names (trade names).

One item is selected from "AAAA", "BBBB", "CCCC", "DDDD", "EEEE", "Not applicable", and "Return to initial state" of the detergent name selecting unit 302 and the initial state setting selecting unit 303 and a check mark of the selected item is displayed. If the item displaying the check mark is correct, the user touches the enter button 305. Alternatively, when deselecting the item displaying the check mark, the user touches the cancel button 304.

In addition, in step S12, the display control unit 151 determines whether or not a selection by the user of an arbitrary detergent name from the plurality of detergent names displayed as a list on the detergent name list screen has been completed. At this point, when it is determined that the selection by the user of an arbitrary detergent name has not been completed (NO in step S12), a standby state is entered until the selection by the user of an arbitrary detergent name is completed.

On the other hand, when it is determined that the selection by the user of an arbitrary detergent name has been completed (YES in step S12), in step S13, the second communication control unit 153 controls the second communication unit 12 so as to transmit detergent name specifying information for specifying the arbitrary detergent name accepted by the operation unit 14 and washing machine specifying information to the server 3. The second communication unit 12 transmits the detergent name specifying information that is accepted by the operation unit 14 and the washing machine specifying information to the server 3.

Next, in step S57, the communication unit 31 of the server 3 receives the detergent name specifying information and the washing machine specifying information transmitted by the second communication unit 12 of the portable device 1.

Next, in step S58, the control unit 33 of the server 3 reads out detergent information specified by the detergent name specifying information and the washing machine specifying information received by the communication unit 31 from the storage unit 32. The storage unit 32 stores, for each type of washing machine, detergent information corresponding to each of a plurality of detergent names.

FIG. 9 is a diagram showing an example of detergent information according to the present embodiment. As shown in FIG. 9, detergent information is table data that associates water levels and cup counts of a detergent. For example, a cup count of "0.5" is associated with a water level of "10", a cup count of "1.0" is associated with a water level of "20", and a cup count of "1.4" is associated with a water level of "30". The association of water levels and the cup counts of a detergent differs in accordance with the type of detergent and the type of washing machine. In consideration thereof, the storage unit 32 stores the table data shown in FIG. 9 in association with a detergent name and a type of washing machine. The control unit 33 reads out detergent information corresponding to the detergent name specified by the detergent name specifying information and the type of washing machine specified by the washing machine specifying information from the storage unit 32.

Moreover, while detergent information is a table representing a relationship between water levels and cup counts of a detergent in the present embodiment, the present invention is not particularly limited thereto. Alternatively, detergent information may be a table representing a relationship among water levels, cup counts of a detergent, and the numbers of rinses.

FIG. 10 is a diagram showing a first modification of detergent information according to the present embodiment, and FIG. 11 is a diagram showing a second modification of detergent information according to the present embodiment. As shown in FIGS. 10 and 11, detergent information may be table data that associates water levels, cup counts of a detergent, and the numbers of rinses with each other. In FIG. 10, for example, a cup count of "0.4" is associated with a water level of "10", a cup count of "0.8" is associated with a water level of "20", and a cup count of "1.1" is associated with a water level of "30". In addition, "2" number of rinses is associated with the water levels "10", "20", and "30". The association of water levels, cup counts of a detergent, and the numbers of rinses with each other differs in accordance with the type of detergent and the type of washing machine. Therefore, as shown in FIG. 11, when the type of detergent differs from the detergent shown in FIG. 10, "1" number of rinses is associated with the water levels "10", "20", and "30".

In addition, when the washing machine 2 stores, in advance, a table representing a relationship between water levels and standard cup counts of a detergent, the detergent information may be a coefficient to be multiplied by the standard cup counts of the detergent in the table. FIG. 12 is a diagram showing a third modification of detergent information according to the present embodiment.

As shown in FIG. 12, detergent information may include a coefficient to be multiplied by the cup counts of a detergent and the number of rinses. For example, detergent information includes a cup count calculation coefficient of "0.8" and "2" number of rinses. Moreover, while detergent information includes a coefficient to be multiplied by the cup counts and the number of rinses in the example shown in FIG. 12, the present invention is not particularly limited thereto and may only include a coefficient to be multiplied by the cup counts. In the washing machine 2, table data stored in advance is updated based on detergent information. Moreover, update of table data in the washing machine 2 will be described later.

As described above, since a coefficient to be multiplied by the cup counts of a detergent is transmitted, an amount of information necessary for transmitting detergent information can be reduced compared to a case where table data is transmitted.

Next, in step S59, the control unit 33 controls the communication unit 31 so as to transmit the detergent information read out from the storage unit 32 to the portable device 1. The communication unit 31 transmits the detergent information to the portable device 1.

Next, in step S14, the second communication unit 12 of the portable device 1 receives the detergent information transmitted by the communication unit 31 of the server 3.

Next, in step S15, the display control unit 151 controls the display unit 13 so as to display a communication instructing screen for instructing the user to cause the first communication unit 11 and the washing machine 2 to approach each other so that communication is performed between the first communication unit 11 and the washing machine 2. The display unit 13 displays the communication instructing screen. Moreover, the communication instructing screen displayed in step S15 is the same as the communication instructing screen G1 displayed in step S2. When the communication instructing screen G1 is displayed on the display unit 13 of the portable device 1, the user causes the loop antenna 16 of the portable device 1 and the loop antenna 27 of the washing machine 2 to approach each other so that the portable device 1 and the washing machine 2 are within a distance that enables communication by near-field wireless communication.

Next, in step S16, after the communication instructing screen is displayed on the display unit 13, the first communication control unit 152 controls the first communication unit 11 so as to transmit the detergent information to the washing machine 2. After the communication instructing screen is displayed on the display unit 13, the first communication unit 11 transmits the detergent information to the washing machine 2. Moreover, the first communication unit 11 starts transmission of the detergent information to the washing machine 2 in conjunction with the communication instructing screen being displayed on the display unit 13.

Next, in step S34, after the first communication unit 11 and the washing machine 2 have approached each other within a communicable range, the communication unit 23 of the washing machine 2 receives the detergent information transmitted by the first communication unit 11 of the portable device 1.

Next, in step S35, the laundry control unit 243 of the washing machine 2 stores the detergent information received by the communication unit 23 in the detergent information storage unit 222. At this point, the laundry control unit 243 stores detergent information in the table formats shown in FIGS. 9 to 11 in the detergent information storage unit 222. Moreover, when detergent information is already stored in the detergent information storage unit 222, the laundry control unit 243 updates the already-stored detergent information to new detergent information and stores the new detergent information.

When the detergent information is a coefficient to be multiplied by the cup counts of a detergent shown in FIG. 12, the laundry control unit 243 multiplies the cup counts of the detergent in the already-stored table data and updates the table data.

FIG. 13A is a diagram showing an example of table data before update that is stored in the detergent information storage unit, and FIG. 13B is a diagram showing an example of table data after update that is stored in the detergent information storage unit.

In the table data before update, as shown in FIG. 13A, for example, a cup count of "0.5" is associated with a water level of "10", a cup count of "1.0" is associated with a water level of "20", and a cup count of "1.4" is associated with a water level of "30". In addition, "1" number of rinses is associated with the water levels "10", "20", and "30".

In this case, when the cup count calculation coefficient included in the detergent information is "0.8" and the number of rinses is "2", in the table data after update, for example, the cup count corresponding to the water level "10" is changed to "0.4", the cup count corresponding to the water level "20" is changed to "0.8", and the cup count corresponding to the water level "30" is changed to "1.1" as shown in FIG. 13B. In addition, the number of rinses associated with the water levels "10", "20", and "30" is changed to "2".

In this manner, table data updated based on the received detergent information is stored in the detergent information storage unit 222.

Next, in step S36, the laundry control unit 243 controls the communication unit 23 so as to transmit a storage completion notification that notifies that the detergent information has been stored in the washing machine 2 to the portable device 1. The communication unit 23 transmits the storage completion notification to the portable device 1.

Next, in step S17, the first communication unit 11 of the portable device 1 receives the storage completion notification transmitted by the communication unit 23 of the washing machine 2.

Next, in step S18, when the storage completion notification is received by the first communication unit 11, the display control unit 151 switches the display screen on the display unit 13 to a storage completion notification screen for notifying the user that detergent information has been stored in the washing machine 2. The display unit 13 displays the storage completion notification screen.

Figures 14, 15:
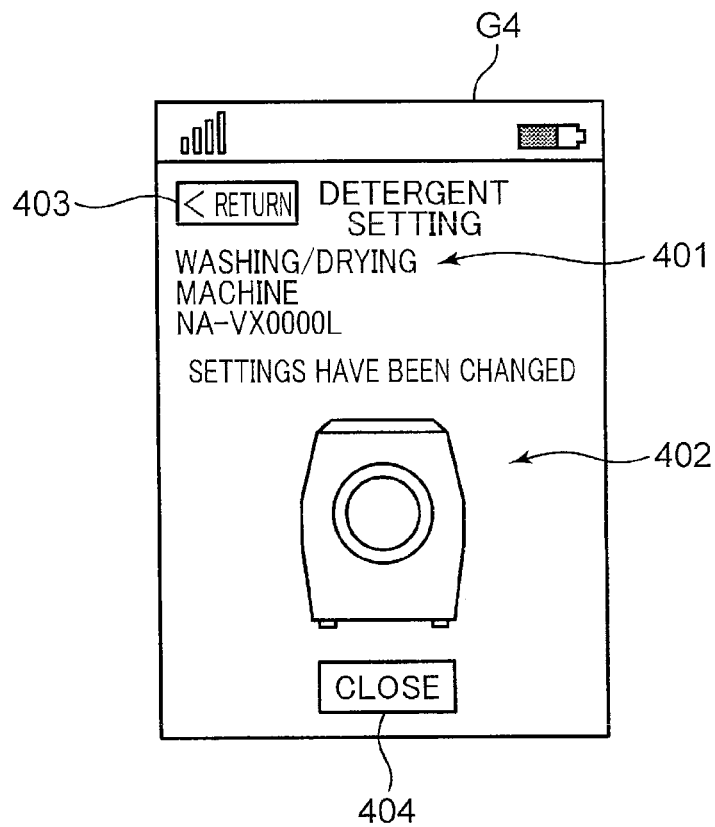
FIG. 14 is a diagram showing an example of a storage completion notification screen according to the present embodiment.
FIG. 15 is a diagram showing an example of softener information according to the present embodiment.

FIG. 14 is a diagram showing an example of the storage completion notification screen according to the present embodiment. As shown in FIG. 14, a storage completion notification screen G4 displays a product name 401 representing a product name and a product number of the washing machine 2, a message 402 indicating that detergent information has been stored in the washing machine 2, a return button 403 for returning to a previous screen, and a close button 404 for returning to the menu screen.

In step S19, the control unit 15 determines whether or not to exit the application for displaying the menu screen for controlling the washing machine 2 on the display unit 13. At this point, the operation unit 14 accepts an exit instruction of the application by the user. The control unit 15 exits the application based on the accepted exit instruction. At this point, when it is determined that the application is to be exited (YES in step S19), the process is terminated. On the other hand, when it is determined that the application is not to be exited (NO in step S19), a return is made to the process of step S7 and the menu screen is subsequently displayed.

As described above, since a selection of an arbitrary detergent name by the user from a plurality of detergent names displayed as a list on the detergent name list screen is accepted, detergent information related to a detergent specified based on washing machine specifying information for specifying the washing machine 2 and detergent name specifying information for specifying the arbitrary detergent name is transmitted to the washing machine 2, and a laundry operation of the washing machine 2 is controlled based on the detergent information, an accurate amount of detergent that conforms to a detergent can be readily set even when a different detergent is used.

Hereinafter, a laundry operation by the washing machine 2 according to the present embodiment will be described.

First, the operation unit 25 accepts start of laundry. A start of laundry is accepted due to a start button provided in the operation unit 25 being pressed down by the user.

Next, the clothing amount detecting unit 21 detects an amount of clothing in the washing tub. Next, the water level calculating unit 241 calculates a water level in accordance with the amount of clothing in the washing tub which is detected by the clothing amount detecting unit 21. Next, the detergent amount calculating unit 242 calculates an amount of detergent in accordance with the water level calculated by the water level calculating unit 241. At this point, the detergent amount calculating unit 242 refers to the detergent information storage unit 222 and reads out an amount of detergent (a cup count as measured in a measuring instrument) corresponding to the water level calculated by the water level calculating unit 241.

Next, the laundry control unit 243 displays the amount of detergent calculated by the detergent amount calculating unit 242 on the display unit 26. At this point, the user introduces a detergent in the amount of detergent displayed on the display unit 26 into the washing tub.

Next, the laundry control unit 243 determines whether or not a lid of the washing tub has been closed. When it is determined that the lid of the washing tub has been closed, the laundry control unit 243 starts laundry. On the other hand, when it is determined that the lid of the washing tub has not been closed, the laundry control unit 243 enters a standby state until the lid of the washing tub is closed. Moreover, when a washing time has been reserved, after the lid of the washing tub has been closed, the laundry control unit 243 determines whether or not the current time is the reserved washing time. In addition, when it is determined that the current time is the reserved washing time, the laundry control unit 243 starts laundry, and when it is determined that the current time is not the reserved washing time, the laundry control unit 243 enters a standby state.

Moreover, the washing machine 2 may include a detergent storing unit in which a detergent is stored in advance. In this case, when start of laundry by the user is accepted, detection of an amount of clothing, calculation of a water level, and calculation of an amount of detergent are automatically performed and the detergent in an amount in accordance with the calculated amount of detergent is automatically sent from the detergent storing unit into the washing tub.

Moreover, while detergent information related to a detergent is stored in the washing machine 2 in the present embodiment, the present invention is not limited thereto. Alternatively, softener information related to a softener may be stored in the washing machine 2. In this case, the display unit 13 further displays a softener name list screen on which a plurality of softener names corresponding to a plurality of softeners to be used in the washing machine 2 are displayed as a list. The display control unit 151 switches a display screen to be displayed on the display unit 13 to any one of the communication instructing screen, the detergent name list screen, and the softener name list screen. The second communication unit 12 transmits the washing machine specifying information received by the first communication unit 11 to the server 3 and receives softener name list screen information for causing the softener name list screen to be displayed from the server 3.

The display control unit 151 switches the display screen to the softener name list screen based on the softener name list screen information received by the second communication unit 12. The operation unit 14 accepts a selection of an arbitrary softener name by the user from the plurality of softener names displayed as a list on the softener name list screen. The second communication unit 12 transmits, to the server 3, softener name specifying information for specifying the arbitrary softener name accepted by the operation unit 14 and the washing machine specifying information and receives, from the server 3, softener information related to a softener specified based on the softener name specifying information and the washing machine specifying information. When softener information is received by the second communication unit 12, the display control unit 151 switches the display screen to the communication instructing screen. The first communication unit 11 transmits the softener information received by the second communication unit 12 to the washing machine 2.

The storage unit 32 of the server 3 stores, for each type of the washing machine 2, softener information corresponding to each of a plurality of softener names. When the washing machine specifying information from the portable device 1 is received by the communication unit 31 of the server 3, the control unit 33 of the server 3 creates softener name list screen information in accordance with the washing machine 2 specified by the washing machine specifying information and controls the communication unit 31 so as to transmit the created softener name list screen information to the portable device 1. In addition, when the softener name specifying information and the washing machine specifying information from the portable device 1 are received by the communication unit 31, the control unit 33 reads out the softener information specified based on the softener name specifying information and the washing machine specifying information from the storage unit 32 and controls the communication unit 31 so as to transmit the read-out softener information to the portable device 1.

When softener information from the portable device 1 is received by the communication unit 23, the laundry control unit 243 of the washing machine 2 stores the received softener information in the storage unit 22 and controls laundry operations based on the received softener information.

FIG. 15 is a diagram showing an example of softener information according to the present embodiment. As shown in FIG. 15, softener information is table data that associates water levels and cup counts of a softener. For example, a cup count of "0.3" is associated with a water level of "10", a cup count of "0.4" is associated with a water level of "20", and a cup count of "0.6" is associated with a water level of "30". The association of water levels and the cup counts of a softener differs in accordance with the type of softener and the type of washing machine. In consideration thereof, the storage unit 32 stores the table data shown in FIG. 15 in association with a softener name and a type of washing machine. The control unit 33 reads out softener information corresponding to the softener name specified by the softener name specifying information and the type of washing machine specified by the washing machine specifying information from the storage unit 32.

Moreover, when the washing machine 2 stores, in advance, a table representing a relationship between water levels and standard cup counts of a softener, the softener information may be a coefficient to be multiplied by the standard cup counts of the softener in the table.

In addition, while the portable device 1 communicates with the washing machine 2 in the present embodiment, the present invention is not particularly limited thereto. Alternatively, the portable device 1 may communicate with an electric device (electrical home appliance) used in a home such as a television set, a refrigerator, a microwave oven, and the like in addition to the washing machine 2.

In this case, the display unit 13 displays a communication instructing screen that instructs the user to cause the first communication unit 11 and the electric device to communicate with each other and a setting information list screen that displays at least a plurality of pieces of setting information used by the electric device as a list. Moreover, for example, setting information is a parameter for operating the electric device and an operation program representing an operation sequence of the electric device. The display control unit 151 switches a display screen to be displayed on the display unit 13 to either the communication instructing screen or the setting information list screen.

In addition, after the communication instructing screen is displayed on the display unit 13, the first communication unit 11 transmits request information that requests electric device specifying information for specifying the electric device to the electric device and receives the electric device specifying information from the electric device. The second communication unit 12 transmits the electric device specifying information received by the first communication unit 11 to the server 3 and receives setting information list screen information for causing the setting information list screen to be displayed from the server 3.

The display control unit 151 switches the display screen to the setting information list screen based on the setting information list screen information received by the second communication unit 12. The operation unit 14 accepts a selection of arbitrary setting information by the user from the plurality of pieces of setting information displayed as a list on the setting information list screen. The second communication unit 12 transmits setting specifying information for specifying the arbitrary setting information accepted by the operation unit 14 and the electric device specifying information to the server 3 and receives setting information specified based on the setting specifying information and the electric device specifying information from the server 3.

When setting information is received by the second communication unit 12, the display control unit 151 switches the display screen to the communication instructing screen. After the communication instructing screen is displayed on the display unit 13, the first communication unit 11 transmits the setting information received by the second communication unit 12 to the electric device.

As described above, since a selection by the user of arbitrary setting information from a plurality of pieces of setting information displayed as a list on the setting information list screen is accepted and setting information specified based on electric device specifying information for specifying an electric device and setting specifying information for specifying arbitrary setting information is transmitted to the electric device, setting information of the electric device can be readily rewritten and the electric device can be controlled in accordance with the setting information.

The specific embodiment described above primarily includes an invention configured as described below.

A laundry system according to an aspect of the present invention comprises: a server; a washing machine; and a communication device communicably connected to the server and the washing machine, wherein: the communication device includes: a first communication unit that communicates with the washing machine using wireless communication; a second communication unit that communicates with the server using a network; a display unit that displays a detergent name list screen on which a plurality of detergent names corresponding to a plurality of detergents to be used in the washing machine are displayed as a list; an input accepting unit that accepts input by a user; and a display control unit that switches a display screen to be displayed on the display unit to the detergent name list screen, the first communication unit transmitting, to the washing machine, request information that requests washing machine specifying information for specifying the washing machine and receiving the washing machine specifying information from the washing machine, the second communication unit transmitting, to the server, the washing machine specifying information received by the first communication unit and receiving, from the server, detergent name list screen information for causing the detergent name list screen to be displayed, the display control unit switching the display screen to the detergent name list screen based on the detergent name list screen information received by the second communication unit, the input accepting unit accepting a selection of an arbitrary detergent name by the user from the plurality of detergent names displayed as a list on the detergent name list screen, the second communication unit transmitting, to the server, detergent name specifying information for specifying the arbitrary detergent name accepted by the input accepting unit and the washing machine specifying information and receiving, from the server, detergent information related to a detergent specified based on the detergent name specifying information and the washing machine specifying information, and the first communication unit transmitting the detergent information received by the second communication unit to the washing machine, the washing machine includes: a washing machine specifying information storage unit that stores the washing machine specifying information; a washing machine communication unit that communicates with the communication device using wireless communication; and a washing machine control unit which, when the request information from the communication device is received by the washing machine communication unit, reads out the washing machine specifying information from the washing machine specifying information storage unit and controls the washing machine communication unit so as to transmit the read-out washing machine specifying information to the communication device, and when the detergent information from the communication device is received by the washing machine communication unit, controls a laundry operation based on the received detergent information, and the server includes: a server communication unit that communicates with the communication device using a network; a first detergent information storage unit that stores, for each type of washing machine, the detergent information corresponding to each of a plurality of detergent names; and a server control unit which, when the washing machine specifying information from the communication device is received by the server communication unit, creates the detergent name list screen information in accordance with a washing machine specified by the washing machine specifying information and controls the server communication unit so as to transmit the created detergent name list screen information to the communication device, and when the detergent name specifying information and the washing machine specifying information from the communication device are received by the server communication unit, reads out the detergent information specified based on the detergent name specifying information and the washing machine specifying information from the first detergent information storage unit and controls the server communication unit so as to transmit the read-out detergent information to the communication device.

According to this configuration, a first communication unit of a communication device communicates with a washing machine using wireless communication and a second communication unit of the communication device communicates with a server using a network. A display unit of the communication device displays a detergent name list screen on which a plurality of detergent names corresponding to a plurality of detergents to be used in the washing machine are displayed as a list. An input accepting unit of the communication device accepts input by a user. The display control unit of the communication device switches a display screen to be displayed on the display unit to the detergent name list screen. In addition, the first communication unit transmits, to the washing machine, request information that requests washing machine specifying information for specifying the washing machine and receives the washing machine specifying information from the washing machine. The second communication unit transmits, to the server, the washing machine specifying information received by the first communication unit and receives, from the server, detergent name list screen information for causing the detergent name list screen to be displayed. The display control unit switches the display screen to the detergent name list screen based on the detergent name list screen information received by the second communication unit. The input accepting unit accepts a selection of an arbitrary detergent name by the user from the plurality of detergent names displayed as a list on the detergent name list screen. The second communication unit transmits, to the server, detergent name specifying information for specifying the arbitrary detergent name accepted by the input accepting unit and the washing machine specifying information and receives, from the server, detergent information related to a detergent specified based on the detergent name specifying information and the washing machine specifying information. The first communication unit transmits the detergent information received by the second communication unit to the washing machine. In addition, a washing machine specifying information storage unit of the washing machine stores the washing machine specifying information. A washing machine communication unit of the washing machine communicates with the communication device using wireless communication. When the request information from the communication device is received by the washing machine communication unit, a washing machine control unit of the washing machine reads out the washing machine specifying information from the washing machine specifying information storage unit and controls the washing machine communication unit so as to transmit the read-out washing machine specifying information to the communication device. When the detergent information from the communication device is received by the washing machine communication unit, the washing machine control unit of the washing machine controls a laundry operation based on the received detergent information. A server communication unit of the server communicates with the communication device using a network. A first detergent information storage unit of the server stores, for each type of washing machine, the detergent information corresponding to each of a plurality of detergent names. When the washing machine specifying information from the communication device is received by the server communication unit, a server control unit of the server creates the detergent name list screen information in accordance with a washing machine specified by the washing machine specifying information and controls the server communication unit so as to transmit the created detergent name list screen information to the communication device. When the detergent name specifying information and the washing machine specifying information from the communication device are received by the server communication unit, the server control unit of the server reads out the detergent information specified based on the detergent name specifying information and the washing machine specifying information from the first detergent information storage unit and controls the server communication unit so as to transmit the read-out detergent information to the communication device.

Therefore, since a selection of an arbitrary detergent name by the user from a plurality of detergent names displayed as a list on the detergent name list screen is accepted, detergent information related to a detergent specified based on washing machine specifying information for specifying a washing machine and detergent name specifying information for specifying an arbitrary detergent name is transmitted to the washing machine, and a laundry operation of the washing machine is controlled based on the detergent information, an accurate amount of detergent that conforms to a detergent can be readily set even when a different detergent is used. Specifically, since an accurate amount of detergent can be set simply by selecting information displayed on a communication device and having a washing machine and the communication device communicate with each other rather than inputting a water level and an amount of detergent corresponding to the water level, operations are simplified.

In addition, in the laundry system described above, favorably, the display unit further displays a communication instructing screen that instructs the user to cause the first communication unit and the washing machine to communicate with each other, the display control unit switches the display screen to be displayed on the display unit to either the communication instructing screen or the detergent name list screen, the first communication unit transmits the request information to the washing machine after the communication instructing screen is displayed on the display unit, the display control unit switches the display screen to the communication instructing screen when the detergent information is received by the second communication unit, and the first communication unit transmits the detergent information received by the second communication unit to the washing machine after the communication instructing screen is displayed on the display unit.

According to this configuration, the display unit further displays a communication instructing screen that instructs the user to cause the first communication unit and the washing machine to communicate with each other. The display control unit switches the display screen to be displayed on the display unit to either the communication instructing screen or the detergent name list screen. After the communication instructing screen is displayed on the display unit, the first communication unit transmits the request information to the washing machine. When the detergent information is received by the second communication unit, the display control unit switches the display screen to the communication instructing screen. In addition, after the communication instructing screen is displayed on the display unit, the first communication unit transmits the detergent information received by the second communication unit to the washing machine.

Therefore, since the request information or the detergent information is transmitted to the washing machine after the communication instructing screen that instructs the user to cause the first communication unit and the washing machine to communicate with each other is displayed, a timing for starting communication with the washing machine can be notified to the user.

In addition, in the laundry system described above, favorably, the wireless communication is near-field wireless communication, the communication instructing screen is a screen for instructing the user to cause the first communication unit and the washing machine to approach each other so that communication is performed between the first communication unit and the washing machine, and the first communication unit receives the washing machine specifying information from the washing machine after the first communication unit and the washing machine have approached each other within a communicable range.

According to this configuration, the wireless communication is near-field wireless communication, and the communication instructing screen is a screen for instructing the user to cause the first communication unit and the washing machine to approach each other so that communication is performed between the first communication unit and the washing machine. After the first communication unit and the washing machine have approached each other within a communicable range, the first communication unit receives the washing machine specifying information from the washing machine.

Therefore, since washing machine specifying information is received from the washing machine after the first communication unit and the washing machine have approached each other within a communicable range, the user need not perform troublesome input operations for causing the communication device and the washing machine to communicate with each other and can have the communication device and the washing machine start communicating with each other by simply bringing the communication device close to the washing machine.

In addition, in the laundry system described above, favorably, the washing machine further includes a second detergent information storage unit that stores the detergent information, wherein when the detergent information from the communication device is received by the washing machine communication unit, the washing machine control unit stores the received detergent information in the second detergent information storage unit and controls a laundry operation based on the detergent information stored in the second detergent information storage unit.

According to this configuration, the second detergent information storage unit of the washing machine stores detergent information. When detergent information from the communication device is received by the washing machine communication unit, the washing machine control unit stores the received detergent information in the second detergent information storage unit and controls a laundry operation based on the detergent information stored in the second detergent information storage unit.

Therefore, since detergent information is stored in the second detergent information storage unit, the detergent information of the washing machine can be readily changed. In addition, since the detergent information stored in the second detergent information storage unit is used, the washing machine can be operated without having the communication device and the washing machine communicate with each other.

In addition, in the laundry system described above, favorably, the first communication unit receives, from the washing machine, a storage completion notification notifying that the detergent information has been stored in the washing machine, the display unit further displays a storage completion notification screen notifying the user that the detergent information has been stored in the washing machine, and when the storage completion notification is received by the first communication unit, the display control unit switches the display screen to the storage completion notification screen.

According to this configuration, the first communication unit receives, from the washing machine, a storage completion notification notifying that the detergent information has been stored in the washing machine. The display unit displays a storage completion notification screen notifying the user that the detergent information has been stored in the washing machine. When the storage completion notification is received by the first communication unit, the display control unit switches the display screen to the storage completion notification screen. Therefore, storage of the detergent information in the washing machine can be notified to the user.

In addition, in the laundry system described above, favorably, the detergent information includes a table representing a relationship between water levels and cup counts of a detergent.

According to this configuration, since the detergent information includes a table representing a relationship between water levels and cup counts of a detergent, a cup count of the detergent which corresponds to a water level can be readily set.

In addition, in the laundry system described above, favorably, the table represents a relationship among water levels, cup counts of a detergent, and the number of rinses.

According to this configuration, since the detergent information includes a table representing a relationship among water levels, cup counts of a detergent, and the number of rinses, a cup count of the detergent and the number of rinses which correspond to a water level can be readily set.

In addition, in the laundry system described above, favorably, when the washing machine stores, in advance, a table representing a relationship between water levels and standard cup counts of a detergent, the detergent information includes a coefficient to be multiplied by the standard cup counts of the detergent in the table.

According to this configuration, since a coefficient to be multiplied by the cup counts of a detergent is transmitted, an amount of information necessary for transmitting detergent information can be reduced compared to a case where table data is transmitted.

In addition, in the laundry system described above, favorably, the display unit further displays a softener name list screen on which a plurality of softener names corresponding to a plurality of softeners to be used in the washing machine are displayed as a list, the display control unit switches a display screen to be displayed on the display unit to either the detergent name list screen or the softener name list screen, the second communication unit transmits, to the server, the washing machine specifying information received by the first communication unit and receives, from the server, softener name list screen information for causing the softener name list screen to be displayed, the display control unit switches the display screen to the softener name list screen based on the softener name list screen information received by the second communication unit, the input accepting unit accepts a selection of an arbitrary softener name by the user from the plurality of softener names displayed as a list on the softener name list screen, the second communication unit transmits, to the server, softener name specifying information for specifying the arbitrary softener name accepted by the input accepting unit and the washing machine specifying information and receives, from the server, softener information related to a softener specified based on the softener name specifying information and the washing machine specifying information, and the first communication unit transmits the softener information received by the second communication unit to the washing machine.

According to this configuration, the display unit displays a softener name list screen on which a plurality of softener names corresponding to a plurality of softeners to be used in the washing machine are displayed as a list. The display control unit switches a display screen to be displayed on the display unit to either the detergent name list screen or the softener name list screen. The second communication unit transmits, to the server, the washing machine specifying information received by the first communication unit and receives, from the server, softener name list screen information for causing the softener name list screen to be displayed. The display control unit switches the display screen to the softener name list screen based on the softener name list screen information received by the second communication unit. The input accepting unit accepts a selection of an arbitrary softener name by the user from the plurality of softener names displayed as a list on the softener name list screen. The second communication unit transmits, to the server, softener name specifying information for specifying the arbitrary softener name accepted by the input accepting unit and the washing machine specifying information. In addition, the second communication unit receives, from the server, softener information related to a softener specified based on the softener name specifying information and the washing machine specifying information. The first communication unit transmits the softener information received by the second communication unit to the washing machine.

Therefore, since a selection of an arbitrary softener name by the user from a plurality of softener names displayed as a list on the softener name list screen is accepted, softener information related to a softener specified based on washing machine specifying information for specifying a washing machine and softener name specifying information for specifying an arbitrary softener name is transmitted to the washing machine, and a laundry operation of the washing machine is controlled based on the softener information, an accurate amount of softener that conforms to a softener can be readily set even when a different softener is used.

A communication device according to another aspect of the present invention comprises: a first communication unit that communicates with a washing machine using wireless communication; a second communication unit that communicates with a server using a network; a display unit that displays a detergent name list screen on which a plurality of detergent names corresponding to a plurality of detergents to be used in the washing machine are displayed as a list; an input accepting unit that accepts input by a user; and a display control unit that switches a display screen to be displayed on the display unit to the detergent name list screen, wherein the first communication unit transmits, to the washing machine, request information that requests washing machine specifying information for specifying the washing machine and receives the washing machine specifying information from the washing machine, the second communication unit transmits, to the server, the washing machine specifying information received by the first communication unit and receives, from the server, detergent name list screen information for causing the detergent name list screen to be displayed, the display control unit switches the display screen to the detergent name list screen based on the detergent name list screen information received by the second communication unit, the input accepting unit accepts a selection of an arbitrary detergent name by the user from the plurality of detergent names displayed as a list on the detergent name list screen, the second communication unit transmits, to the server, detergent name specifying information for specifying the arbitrary detergent name accepted by the input accepting unit and the washing machine specifying information and receives, from the server, detergent information related to a detergent specified based on the detergent name specifying information and the washing machine specifying information, and the first communication unit transmits the detergent information received by the second communication unit to the washing machine.

According to this configuration, a first communication unit communicates with a washing machine using wireless communication and a second communication unit communicates with a server using a network. A display unit displays a detergent name list screen on which a plurality of detergent names corresponding to a plurality of detergents to be used in the washing machine are displayed as a list. An input accepting unit accepts input by a user. A display control unit switches a display screen to be displayed on the display unit to the detergent name list screen. In addition, the first communication unit transmits, to the washing machine, request information that requests washing machine specifying information for specifying the washing machine and receives the washing machine specifying information from the washing machine. The second communication unit transmits, to the server, the washing machine specifying information received by the first communication unit and receives, from the server, detergent name list screen information for causing the detergent name list screen to be displayed. The display control unit switches the display screen to the detergent name list screen based on the detergent name list screen information received by the second communication unit. The input accepting unit accepts a selection of an arbitrary detergent name by the user from the plurality of detergent names displayed as a list on the detergent name list screen. The second communication unit transmits, to the server, detergent name specifying information for specifying the arbitrary detergent name accepted by the input accepting unit and the washing machine specifying information. In addition, the second communication unit receives, from the server, detergent information related to a detergent specified based on the detergent name specifying information and the washing machine specifying information. The first communication unit transmits the detergent information received by the second communication unit to the washing machine.

Therefore, since a selection of an arbitrary detergent name by the user from a plurality of detergent names displayed as a list on the detergent name list screen is accepted, detergent information related to a detergent specified based on washing machine specifying information for specifying a washing machine and detergent name specifying information for specifying an arbitrary detergent name is transmitted to the washing machine, and a laundry operation of the washing machine is controlled based on the detergent information, an accurate amount of detergent that conforms to a detergent can be readily set even when a different detergent is used.

A communication method according to another aspect of the present invention comprises: a request information transmitting step in which a first communication unit that communicates with a washing machine using wireless communication transmits, to the washing machine, request information that requests washing machine specifying information for specifying a washing machine; a washing machine specifying information receiving step in which the first communication unit receives the washing machine specifying information from the washing machine; a washing machine specifying information transmitting step in which a second communication unit that communicates with a server using a network transmits the washing machine specifying information received by the first communication unit to the server; a detergent name list screen information receiving step in which the second communication unit receives, from the server, detergent name list screen information for displaying a detergent name list screen on which a plurality of detergent names corresponding to a plurality of detergents to be used in the washing machine are displayed as a list; a detergent name list screen switching step in which the display screen is switched to the detergent name list screen based on the detergent name list screen information received by the second communication unit; a selection accepting step in which a selection of an arbitrary detergent name by a user from the plurality of detergent names displayed as a list on the detergent name list screen is accepted; a detergent name specifying information transmitting step in which the second communication unit transmits, to the server, detergent name specifying information for specifying the arbitrary detergent name accepted in the selection accepting step and the washing machine specifying information; a detergent information receiving step in which the second communication unit receives, from the server, detergent information related to a detergent specified based on the detergent name specifying information and the washing machine specifying information; and a detergent information transmitting step in which the first communication unit transmits the detergent information received by the second communication unit to the washing machine.

According to this configuration, a first communication unit that communicates with a washing machine using wireless communication transmits request information that requests washing machine specifying information for specifying a washing machine to the washing machine. Next, the first communication unit receives the washing machine specifying information from the washing machine. Next, a second communication unit that communicates with a server using a network transmits the washing machine specifying information received by the first communication unit to the server. Next, the second communication unit receives, from the server, detergent name list screen information for displaying a detergent name list screen on which a plurality of detergent names corresponding to a plurality of detergents to be used in the washing machine are displayed as a list. Next, the display screen is switched to the detergent name list screen based on the detergent name list screen information received by the second communication unit. Next, a selection of an arbitrary detergent name by a user from the plurality of detergent names displayed as a list on the detergent name list screen is accepted. Next, the second communication unit transmits, to the server, detergent name specifying information for specifying the accepted arbitrary detergent name and the washing machine specifying information. Next, the second communication unit receives detergent information related to a detergent specified based on the detergent name specifying information and the washing machine specifying information from the server. Next, the first communication unit transmits the detergent information received by the second communication unit to the washing machine.

Therefore, since a selection of an arbitrary detergent name by a user from a plurality of detergent names displayed as a list on the detergent name list screen is accepted, detergent information related to a detergent specified based on washing machine specifying information for specifying a washing machine and detergent name specifying information for specifying an arbitrary detergent name is transmitted to the washing machine, and a laundry operation of the washing machine is controlled based on the detergent information, an accurate amount of detergent that conforms to a detergent can be readily set even when a different detergent is used.

A communication program according to another aspect of the present invention causes a computer to function as: a first communication control unit which controls a first communication unit that communicates with a washing machine using wireless communication; a second communication control unit which controls a second communication unit that communicates with a server using a network; and a display control unit which switches a display screen to be displayed on a display unit to a detergent name list screen on which a plurality of detergent names corresponding to a plurality of detergents to be used in the washing machine are displayed as a list, wherein the first communication control unit controls the first communication unit so as to transmit, to the washing machine, request information that requests washing machine specifying information for specifying the washing machine and controls the first communication unit so as to receive the washing machine specifying information from the washing machine, the second communication control unit controls the second communication unit so as to transmit, to the server, the washing machine specifying information received by the first communication unit and controls the second communication unit so as to receive, from the server, detergent name list screen information for causing the detergent name list screen to be displayed, the display control unit switches the display screen to the detergent name list screen based on the detergent name list screen information received by the second communication unit, the second communication control unit controls the second communication unit so as to transmit, to the server, detergent name specifying information for specifying an arbitrary detergent name selected by a user from the plurality of detergent names displayed as a list on the detergent name list screen and the washing machine specifying information and controls the second communication unit so as to receive, from the server, detergent information related to a detergent specified based on the detergent name specifying information and the washing machine specifying information, and the first communication control unit controls the first communication unit so as to transmit the detergent information received by the second communication unit to the washing machine.

According to this configuration, a first communication control unit controls a first communication unit that communicates with a washing machine using wireless communication and a second communication control unit controls a second communication unit that communicates with a server using a network. A display control unit switches a display screen to be displayed on a display unit to a detergent name list screen on which a plurality of detergent names corresponding to a plurality of detergents to be used in the washing machine are displayed as a list. In addition, the first communication control unit controls the first communication unit so as to transmit request information that requests washing machine specifying information for specifying the washing machine to the washing machine and controls the first communication unit so as to receive the washing machine specifying information from the washing machine. The second communication control unit controls the second communication unit so as to transmit the washing machine specifying information received by the first communication unit to the server and controls the second communication unit so as to receive detergent name list screen information for causing the detergent name list screen to be displayed from the server. The display control unit switches the display screen to the detergent name list screen based on the detergent name list screen information received by the second communication unit. The second communication control unit controls the second communication unit so as to transmit detergent name specifying information for specifying an arbitrary detergent name selected by a user from the plurality of detergent names displayed as a list on the detergent name list screen and the washing machine specifying information to the server. In addition, the second communication control unit controls the second communication unit so as to receive detergent information related to a detergent specified based on the detergent name specifying information and the washing machine specifying information from the server. The first communication control unit controls the first communication unit so as to transmit the detergent information received by the second communication unit to the washing machine.

Therefore, since a selection of an arbitrary detergent name by a user from a plurality of detergent names displayed as a list on the detergent name list screen is accepted, detergent information related to a detergent specified based on washing machine specifying information for specifying a washing machine and detergent name specifying information for specifying an arbitrary detergent name is transmitted to the washing machine, and a laundry operation of the washing machine is controlled based on the detergent information, an accurate amount of detergent that conforms to a detergent can be readily set even when a different detergent is used.

A washing machine according to another aspect of the present invention comprises: a washing machine specifying information storage unit that stores washing machine specifying information for specifying a washing machine; a washing machine communication unit that communicates with a communication device using wireless communication; and a washing machine control unit which, when request information that requests the washing machine specifying information from the communication device is received by the washing machine communication unit, reads out the washing machine specifying information from the washing machine specifying information storage unit and controls the washing machine communication unit so as to transmit the read-out washing machine specifying information to the communication device, and when detergent information related to a detergent specified based on detergent name specifying information for specifying an arbitrary detergent name selected by a user from a plurality of detergent names and the washing machine specifying information is received by the washing machine communication unit, controls a laundry operation based on the received detergent information.

According to this configuration, a washing machine specifying information storage unit stores washing machine specifying information for specifying a washing machine. A washing machine communication unit communicates with a communication device using wireless communication. When request information that requests the washing machine specifying information from the communication device is received by the washing machine communication unit, a washing machine control unit reads out the washing machine specifying information from the washing machine specifying information storage unit and controls the washing machine communication unit so as to transmit the read-out washing machine specifying information to the communication device. In addition, when detergent information related to a detergent specified based on detergent name specifying information for specifying an arbitrary detergent name selected by a user from a plurality of detergent names and the washing machine specifying information is received by the washing machine communication unit, the washing machine control unit controls a laundry operation based on the received detergent information.

Therefore, since detergent information related to a detergent specified based on detergent name specifying information for specifying an arbitrary detergent name selected by a user from a plurality of detergent names and washing machine specifying information for specifying the washing machine is received and a laundry operation of the washing machine is controlled based on the received detergent information, an accurate amount of detergent that conforms to a detergent can be readily set even when a different detergent is used.

A communication device according to another aspect of the present invention comprises: a first communication unit that communicates with an electric device using wireless communication; a second communication unit that communicates with a server using a network; a display unit that displays a communication instructing screen that instructs a user to cause the first communication unit and the electric device to communicate with each other and a setting information list screen that displays at least a plurality of pieces of setting information used by the electric device as a list; an input accepting unit that accepts an input by the user; and a display control unit that switches a display screen to be displayed on the display unit to either the communication instructing screen or the setting information list screen, wherein the first communication unit transmits, to the electric device, request information that requests electric device specifying information for specifying the electric device and receives the electric device specifying information from the electric device after the communication instructing screen is displayed on the display unit, the second communication unit transmits the electric device specifying information received by the first communication unit to the server and receives, from the server, setting information list screen information for causing the setting information list screen to be displayed, the display control unit switches the display screen to the setting information list screen based on the setting information list screen information received by the second communication unit, the input accepting unit accepts a selection of arbitrary setting information by the user from the plurality of pieces of setting information displayed as a list on the setting information list screen, the second communication unit transmits, to the server, setting specifying information for specifying the arbitrary setting information accepted by the input accepting unit and the electric device specifying information and receives, from the server, setting information specified based on the setting specifying information and the electric device specifying information, the display control unit switches the display screen to the communication instructing screen when the setting information is received by the second communication unit, and the first communication unit transmits the setting information received by the second communication unit to the electric device after the communication instructing screen is displayed on the display unit.

According to this configuration, a first communication unit communicates with an electric device using wireless communication and a second communication unit communicates with a server using a network. A display unit displays a communication instructing screen that instructs a user to cause the first communication unit and the electric device to communicate with each other and a setting information list screen that displays at least a plurality of pieces of setting information used by the electric device as a list. An input accepting unit accepts input by the user. A display control unit switches a display screen to be displayed on the display unit to either the communication instructing screen or the setting information list screen. After the communication instructing screen is displayed on the display unit, the first communication unit transmits, to the electric device, request information that requests electric device specifying information for specifying the electric device and receives the electric device specifying information from the electric device. The second communication unit transmits the electric device specifying information received by the first communication unit to the server and receives, from the server, setting information list screen information for causing the setting information list screen to be displayed. The display control unit switches the display screen to the setting information list screen based on the setting information list screen information received by the second communication unit. The input accepting unit accepts a selection of arbitrary setting information by the user from the plurality of pieces of setting information displayed as a list on the setting information list screen. The second communication unit transmits, to the server, setting specifying information for specifying the arbitrary setting information accepted by the input accepting unit and the electric device specifying information. In addition, the second communication unit receives, from the server, setting information specified based on the setting specifying information and the electric device specifying information. When setting information is received by the second communication unit, the display control unit switches the display screen to the communication instructing screen. In addition, after the communication instructing screen is displayed on the display unit, the first communication unit transmits the setting information received by the second communication unit to the electric device.

Therefore, since a selection by a user of arbitrary setting information from a plurality of pieces of setting information displayed as a list on the setting information list screen is accepted and setting information specified based on electric device specifying information for specifying an electric device and setting specifying information for specifying arbitrary setting information is transmitted to the electric device, setting information of the electric device can be readily rewritten and the electric device can be controlled in accordance with the setting information.

It is to be understood that the specific embodiments or examples described in Description of Embodiments are merely illustrative of the technical contents of the present invention, and that the present invention should not be construed as being limited to such specific examples. Obviously, many modifications and variations of the present invention are possible without departing from the spirit of the invention and the scope of the following claims.

INDUSTRIAL APPLICABILITY

The laundry system, the communication device, the communication method, the communication program, and the washing machine according to the present invention enable an accurate amount of detergent conforming to a detergent to be readily set even when a different detergent is used and are useful for a communication device that communicates with a server and a washing machine, a communication method and a communication program, a washing machine, and a laundry system including a server, a washing machine, and a communication device.

The invention claimed is:

1. A communication method to a washing machine, comprising:
  performing by a communication device which comprises at least a processor and a plurality of communication units, wherein the processor executes program codes stored in a memory, configures the communication device to perform communication steps in the following sequence, comprising:
  prior to communication to a remote server:
    communicating by a first communication unit of the communication device with a washing machine using wireless communication, requesting washing machine specifying information be sent back to the communication device, wherein the washing machine specified information comprises washing machine model information, and wherein laundry operation instructions has been previously installed in the washing machine for controlling operations of the washing machine at the time of manufacture;
    receiving by the first communication unit of the communication device, the washing machine specifying information from the washing machine;
    afterwards, communicating by a second communication unit of the communication device with the server using a network to transmit the received washing machine specifying information to the server;

receiving by the second communication unit of the communication device from the server, information consisting of only a detergent name list for displaying a plurality of detergent names comprised in the detergent name list to be used in the washing machine according to the washing machine specified information on the communication device;

next, selecting by an operation unit of the communication device, only a detergent name from the plurality of detergent names in the detergent name list;

accepting a selection on the communication device, the selected detergent name among the plurality of detergent names displayed in the detergent name list;

afterwards, transmitting by the second communication unit of the communication device, only the selected detergent name to the server;

receiving by the second communication unit of the communication device from the server, information consisting of only the selected detergent name; and then, transmitting by the first communication unit of the communication device, the received information of only the selected detergent name from the server to the washing machine, in order that the washing machine operates at a volume of water according to the received information of only the selected detergent name.

2. The communication method according to claim 1, further comprising:

displaying on a communication instructing screen of the communication device, instructions prior to the first communication unit of the communication device communicating with the washing machine to request for the washing machine specifying information.

3. The communication method according to claim 2, wherein the wireless communication is near-field wireless communication, and the communication instructing screen is a screen for instructing a user to initiate the near-field wireless communication with the washing machine.

4. The communication method according to claim 1, further comprising:

receiving from the washing machine, a storage completion notification notifying that the information of only the selected detergent name has been stored in the washing machine; and displaying on a storage completion notification screen, that the information of only the selected detergent name has been stored in the washing machine.

5. The communication method according to claim 1, wherein the information of only the selected detergent name includes a table representing a relationship between water levels and cup counts of a corresponding detergent.

6. The communication method according to claim 5, wherein the table represents a relationship among water levels, cup counts of the detergent name, and the number of rinses.

7. The communication method according to claim 1, further comprising:

receiving by the second communication unit of the communication device from the server, softener name list information and displaying a softener name list corresponding to at least one softener to be used in the washing machine;

selecting by the communication device, a softener name from the softener name list;

transmitting by the second communication unit of the communication device, the selected softener name to the server;

receiving by the second communication unit of the communication device from the server, selected softener information based on the softener name list and the washing machine specifying information; and transmitting by the first communication unit of the communication device, the received selected softener information to the washing machine.

8. A washing machine comprising:

a storage unit that stores washing machine specifying information for specifying the washing machine, wherein the washing machine specified information comprises washing machine model information;

an operation unit that accepts operation input, wherein laundry operation instructions has been previously installed in the operation unit for controlling operations of the washing machine at the time of manufacture;

a communication unit that communicates with a communication device using wireless communication; and a control unit which, when receiving request for the washing machine specifying information from the communication device, reads out the washing machine specifying information from the storage unit and controls the communication unit so as to transmit the read-out washing machine specifying information to the communication device, and when information consisting of only a selected detergent name selected from a detergent name list comprising a plurality of detergent names according to the washing machine specifying information is forwarded by the communication device from a server to the communication unit, the received information consisting of only the selected detergent name is to be utilized by the control unit to control water volume in a laundry operation of the washing machine.

9. The washing machine according to claim 8, wherein the storage unit further stores detergent information, and when the information consisting of only the selected detergent name is received from the communication device, the control unit further stores the received information consisting of only the selected detergent name for controlling the laundry operation.

10. The washing machine according to claim 9, wherein the control unit controls the communication unit so as to transmit, to the communication device, a storage completion notification notifying that the information consisting of only the selected detergent name has been stored in the storage unit.

11. The washing machine according to claim 8, wherein when the washing machine stores, in advance, a table representing a relationship between water levels and standard cup counts of a corresponding detergent, the information consisting of only the selected detergent name includes a coefficient to be multiplied by the standard cup counts of the corresponding detergent in the table.

12. A communication device comprising:

at least a processor and a plurality of communication units, wherein the processor executes program codes stored in a memory, configures the communication device to perform communication steps in the following sequence, comprising:
an operation unit that selects a detergent name;
wherein prior to communication to a remote server:
a first communication unit that first communicates with a washing machine using wireless communication to request washing machine specifying information be sent back to the communication device, wherein the washing machine specified information comprises washing machine model information, and wherein laundry operation instructions has been previously installed in the washing machine for controlling operations of the washing machine at the time of manufacture;
a second communication unit of the communication device that afterwards communicates with a server using a network to transmit the received washing machine specifying information to the server for receiving information consisting of only a detergent name list for displaying a plurality of detergent names comprised in the detergent name list to be used in the washing machine according to the washing machine specified information on the communication device;
a display unit of the communication device displays the detergent name list corresponding to a plurality of detergent names to be used in the washing machine;
an accepting unit of the communication device that accepts input selection of only a detergent name from the detergent name list; and
a control unit of the communication device controls a display screen to display information, wherein
the second communication unit of the communication device transmits the received washing machine specifying information to the server and receives, from the server, information consisting of only a detergent name list for,
the control unit of the communication device displays the detergent name list,
the accepting unit of the communication device accepts a detergent name selected by the user from the plurality of detergent names displayed in the detergent name list,
the second communication unit of the communication device next transmits only a selected detergent name to the server and receives, from the server, information consisting of only the selected detergent name according to the washing machine specifying information, and
the first communication unit of the communication device then transmits the information consisting of only the selected detergent name received from the server to the washing machine;
wherein the washing machine is configured to operate with a volume of water according to the received information consisting of only the selected detergent name.

13. A non-transitory computer-readable recording medium which stores a communication program, wherein when executed by a processor in a communication device, the communication program causes the communication device to perform communication steps in the following sequence, comprising:
prior to communication to a remote server:
controlling a first communication unit to first communicate with a washing machine using wireless communication;
controlling a second communication unit to afterwards communicate with a server using a network; and
controlling a display unit to display a detergent name list displaying a detergent name corresponding to a plurality of detergent names to be used in the washing machine, wherein
the first communication unit transmits to the washing machine, a request for specifying the washing machine and receives the washing machine specifying information from the washing machine, wherein the washing machine specified information comprises washing machine model information, and wherein laundry operation instructions has been previously installed in the washing machine for controlling operations of the washing machine at the time of manufacture,
afterwards, controlling the second communication unit to transmit the received washing machine specifying information to the server and receives from the server, information consisting of only a detergent name list for display,
wherein the display unit displays the detergent name list,
the second communication unit next transmits to the server, only a selected detergent name from among the plurality of detergent names displayed in the detergent name list and receives from the server, information consisting of only the selected detergent name, and
the first communication unit then transmits the received information of only the selected detergent name from the server to the washing machine to configure the washing machine to operate with a volume of water according to the received information of only the selected detergent name.

* * * * *